United States Patent
Frederick et al.

(10) Patent No.: US 11,159,537 B2
(45) Date of Patent: Oct. 26, 2021

(54) MULTICOMPUTER PROCESSING FOR DATA AUTHENTICATION AND EVENT EXECUTION USING A BLOCKCHAIN APPROACH

(71) Applicant: Bank of America Corporation, Charlotte, NC (US)

(72) Inventors: Carl R. Frederick, Lexington, OH (US); Sean M. Gutman, Waxhaw, NC (US); Joseph Castinado, Northglenn, CO (US)

(73) Assignee: Bank of America Corporation, Charlotte, NC (US)

( * ) Notice: Subject to any disclaimer, the term of this patent is extended or adjusted under 35 U.S.C. 154(b) by 164 days.

(21) Appl. No.: 15/827,171

(22) Filed: Nov. 30, 2017

(65) Prior Publication Data
US 2019/0166133 A1    May 30, 2019

(51) Int. Cl.
*H04L 29/06* (2006.01)
*H04L 9/06* (2006.01)
*G06F 21/62* (2013.01)
*G06F 21/44* (2013.01)
*H04L 9/32* (2006.01)
*G06F 16/27* (2019.01)

(52) U.S. Cl.
CPC .............. *H04L 63/12* (2013.01); *G06F 21/44* (2013.01); *G06F 21/6218* (2013.01); *G06F 21/6245* (2013.01); *H04L 9/0637* (2013.01); *H04L 9/3239* (2013.01); *H04L 63/061* (2013.01); *G06F 16/27* (2019.01); *H04L 63/0428* (2013.01); *H04L 2209/38* (2013.01)

(58) Field of Classification Search
CPC ..... H04L 63/12; H04L 9/0637; H04L 63/061; H04L 63/0428; G06F 21/44; G06F 21/6245; G06F 16/27
See application file for complete search history.

(56) References Cited

U.S. PATENT DOCUMENTS

| | | |
|---|---|---|
| 9,298,806 B1 | 3/2016 | Vessenes et al. |
| 9,397,985 B1 | 7/2016 | Seger, II et al. |
| 9,558,524 B2 | 1/2017 | Madhu et al. |

(Continued)

*Primary Examiner* — Samson B Lemma
*Assistant Examiner* — Zoha Piyadehghibi Tafaghodi
(74) *Attorney, Agent, or Firm* — Banner & Witcoff, Ltd.; Michael A. Springs

(57) ABSTRACT

Aspects of the disclosure relate to multicomputer systems and methods for data authentication and event execution using a blockchain approach. Any full node computing device in a network, including a data authentication and event execution computing platform, may receive data from one or more sources. The computing platform may verify the authenticity of at least one aspect of the received data. Once the authenticity of the data has been verified, the computing platform may generate a new block of a user's blockchain by cryptographically encrypting the received data, may add the new block to the user's blockchain, and may store the updated blockchain. The platform may then transmit an indication that the received data has been authenticated to the data source. In addition, the computing platform may generate a command configured to execute an action associated with the new block and may transmit the command to the data source.

20 Claims, 13 Drawing Sheets

(56) References Cited

U.S. PATENT DOCUMENTS

| | | | |
|---|---|---|---|
| 9,635,000 B1 | 4/2017 | Muftic | |
| 2007/0198432 A1* | 8/2007 | Pitroda | G06Q 20/367 705/64 |
| 2014/0279544 A1 | 9/2014 | Baird et al. | |
| 2015/0356523 A1 | 12/2015 | Madden | |
| 2016/0261404 A1 | 9/2016 | Ford et al. | |
| 2016/0261690 A1* | 9/2016 | Ford | H04L 67/1044 |
| 2016/0283920 A1* | 9/2016 | Fisher | G06Q 20/02 |
| 2016/0283941 A1 | 9/2016 | Andrade | |
| 2016/0292680 A1 | 10/2016 | Wilson, Jr. et al. | |
| 2016/0379212 A1 | 12/2016 | Bowman et al. | |
| 2017/0011460 A1* | 1/2017 | Molinari | G06Q 40/04 |
| 2017/0085545 A1* | 3/2017 | Lohe | H04L 63/062 |
| 2017/0140375 A1 | 5/2017 | Kunstel | |
| 2017/0178237 A1 | 6/2017 | Wong | |
| 2017/0221029 A1* | 8/2017 | Lund | H04W 12/04 |
| 2017/0257358 A1* | 9/2017 | Ebrahimi | G06F 21/645 |
| 2017/0279783 A1 | 9/2017 | Milazzo et al. | |
| 2017/0286880 A1 | 10/2017 | Wiig et al. | |
| 2017/0286951 A1 | 10/2017 | Ignatchenko et al. | |
| 2017/0287090 A1 | 10/2017 | Hunn et al. | |
| 2017/0295157 A1 | 10/2017 | Chavez et al. | |
| 2017/0295180 A1 | 10/2017 | Day et al. | |
| 2017/0324738 A1 | 11/2017 | Hari et al. | |
| 2017/0329980 A1 | 11/2017 | Hu et al. | |
| 2017/0329996 A1 | 11/2017 | Wilson | |
| 2017/0330174 A1 | 11/2017 | Demarinis et al. | |
| 2017/0330179 A1 | 11/2017 | Song et al. | |
| 2017/0330180 A1 | 11/2017 | Song et al. | |
| 2017/0331635 A1 | 11/2017 | Barinov et al. | |
| 2017/0331810 A1 | 11/2017 | Kurian | |
| 2017/0337534 A1 | 11/2017 | Goeringer et al. | |
| 2017/0338947 A1 | 11/2017 | Ateniese et al. | |
| 2017/0338957 A1 | 11/2017 | Ateniese et al. | |
| 2017/0338963 A1 | 11/2017 | Berg | |
| 2017/0344580 A1 | 11/2017 | King | |
| 2017/0344987 A1 | 11/2017 | Davis | |
| 2017/0344988 A1 | 11/2017 | Cusden et al. | |
| 2017/0345011 A1 | 11/2017 | Salami et al. | |
| 2017/0346693 A1 | 11/2017 | Dix et al. | |
| 2017/0346833 A1 | 11/2017 | Zhang | |
| 2018/0101842 A1* | 4/2018 | Ventura | G06Q 20/3674 |
| 2018/0137512 A1* | 5/2018 | Georgiadis | H04L 9/3239 |
| 2019/0295162 A1* | 9/2019 | Wang | H04L 9/0866 |

* cited by examiner

MULTICOMPUTER PROCESSING FOR DATA AUTHENTICATION AND EVENT EXECUTION USING A BLOCKCHAIN APPROACH

CROSS-REFERENCE TO RELATED APPLICATIONS

This application is related to U.S. application Ser. No. 15/827,064, filed Nov. 30, 2017, entitled "Multicomputer Processing For Data Authentication Using A Blockchain Approach," now U.S. Pat. No. 10,949,511, issued Mar. 16, 2021 which is being filed concurrently with this application and which is herein incorporated by reference in its entirety.

BACKGROUND

Aspects of the disclosure relate to electrical computers, digital processing systems, and multicomputer data processing of user data using a blockchain approach. In particular, one or more aspects of the disclosure relate to enabling multicomputer processing and authentication of data from social media service computing platforms, property records databases, and other sources. Once this data has been authenticated, aspects of the disclosure further relate to execution of events related to the data.

As computer systems are increasingly utilized to provide automated and electronic services, such computer systems may obtain and maintain increasing amounts of various types of sensitive information, and ensuring the safety, security, and accuracy of this information may be increasingly important. In many instances, however, it may be difficult to ensure the safety and security of such information while also optimizing the efficient and effective technical operations of the computer systems that process such information and/or provide such automated and electronic services.

SUMMARY

Aspects of the disclosure provide effective, efficient, scalable, and convenient technical solutions that address and overcome the technical problems associated with authenticating data and optimizing the efficient and effective technical operations of computer systems. In particular, one or more aspects of the disclosure provide techniques for authenticating user data using multicomputer data processing technology and executing automated actions based on that data to improve data security and enhance technical performance.

In accordance with one or more embodiments, a data authentication and event execution computing platform having at least one processor, a memory, and a communication interface may establish, via the communication interface, a plurality of connections to a plurality of social media service computing platforms. While the plurality of connections is established, the data authentication and event execution computing platform may receive first information from at least one of the plurality of social media service computing platforms. Subsequently, the data authentication and event execution computing platform may verify the authenticity of at least one aspect of the first information. Then the data authentication and event execution computing platform may generate a new block of a blockchain associated with a user at least by cryptographically encrypting the first information. Next, the data authentication and event execution computing platform may add the new block to the blockchain. Finally, the data authentication and event execution computing platform may transmit, via the communication interface, an indication to the at least one of the plurality of social media service computing platforms that the first information has been authenticated.

In some embodiments, generating the new block may comprise hashing the first information. In other embodiments, verifying the authenticity of the at least one aspect of the first information may comprise authenticating the user who authored a social media post. In further aspects, verifying the authenticity of the at least one aspect of the first information may comprise identifying a number of levels of authentication the user associated with the social media post satisfied during authentication of the user prior to posting the social media post.

Further still, the data authentication and event execution computing platform may determine that the authenticity of the at least one aspect of the first information has been verified when the user associated with the social media post has satisfied more than one level of authentication prior to posting the social media post. In one example, a first level of authentication may comprise a login and password to a social media website on which the social media post was posted. In another example, a second level of authentication may comprise an Internet Protocol (IP) address from which an author of the social media post posted the social media post.

In some aspects, the first information may comprise a social media post. In other aspects, the first information may comprise image data posted on a social media website.

Further, the data authentication and event execution computing platform may receive, via the communication interface, authorization from a user computing device to verify the authenticity of the at least one aspect of the first information. In other aspects, the data authentication and event execution computing platform may post the first information to a social media website associated with the at least one of the plurality of social media service computing platforms after verifying the authenticity of the at least one aspect of the first information.

In some aspects, the first information may be associated with the user and verifying the authenticity of the at least one aspect of the first information may comprise identifying that the first information is similar to other information associated with the user.

In accordance with one or more embodiments, a system having at least one processor, a memory, and a communication interface may establish, via the communication interface, a plurality of connections to a plurality of computing platforms. While the plurality of connections is established, the system may receive first information from at least one of the plurality of computing platforms. Subsequently, the system may verify the authenticity of at least one aspect of the first information. Then the system may generate a new block of a blockchain associated with a user at least by cryptographically encrypting the first information. Next, the system may add the new block to the blockchain. The system may then store the blockchain with the new block in the memory. Next, the system may generate a command configured to execute an action associated with the new block. Finally, the system may transmit, via the communication interface, the command to the at least one of the plurality of computing platforms.

In one example, the at least one of the plurality of computing platforms may comprise at least one of a medical records computing platform and a property records computing platform.

In other aspects, the first information may comprise data related to past jobs held by the user, data related to a family of the user, and medical records of the user.

In some aspects, the action may be associated with a smart contract. In another example, the action may comprise execution of a will associated with the user. In yet another example, the action may relate to authentication of the user associated with the first information.

In other aspects, the command may relate to changing a rating of the user associated with the first information based on verifying the authenticity of the at least one aspect of the first information. Also, generating the new block may comprise hashing the first information.

In one example, the first information may comprise data related to property inherited by the user. In another example, the first information may relate to estate management of the user and the command may relate to distributing an estate of the user once the user has died. In yet another example, the action may be intended to be legally binding. Further, the command may relate to improving a rating of the user.

These features, along with many others, are discussed in greater detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
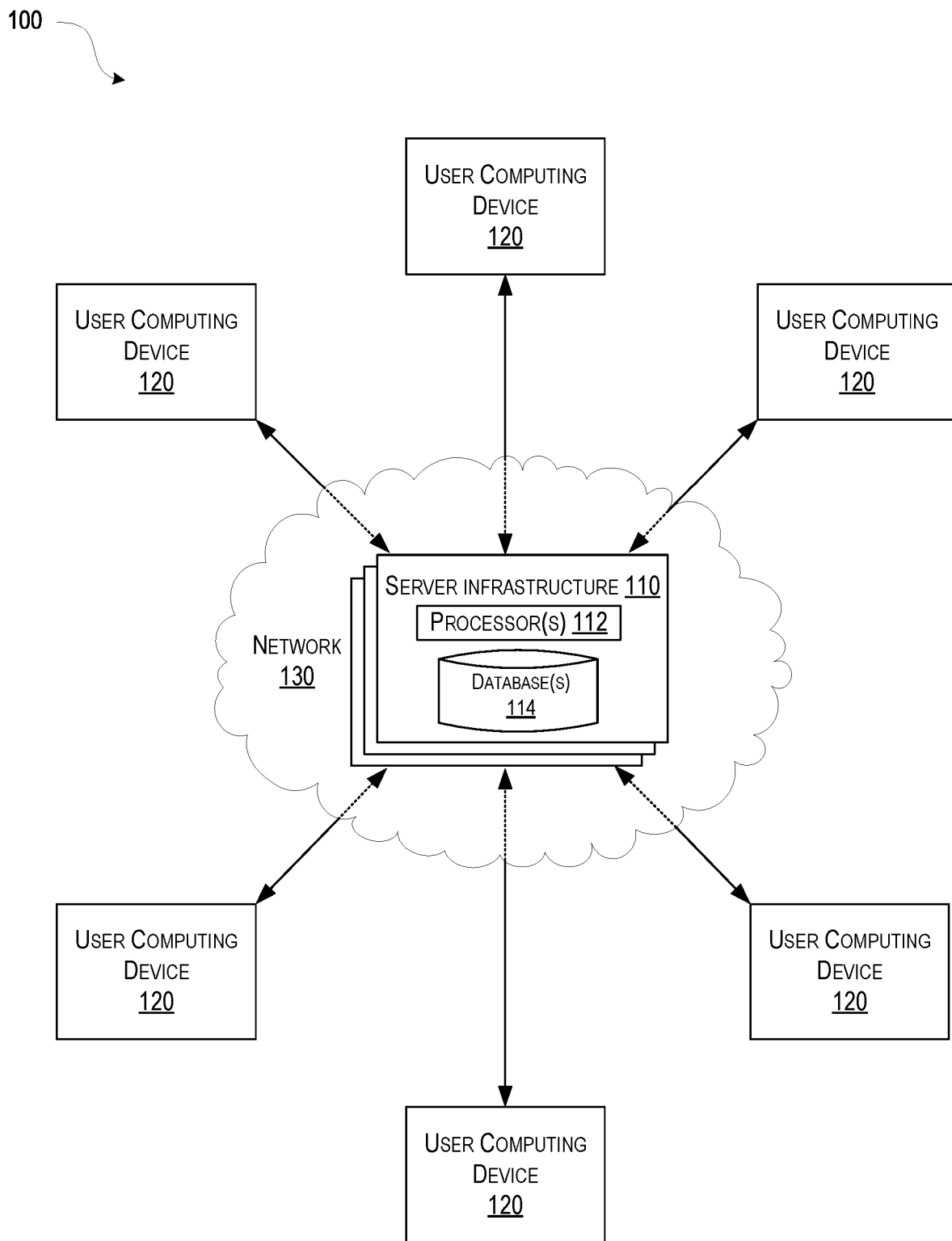
FIG. 1 depicts an illustrative example of a centralized computer system in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is noted that various connections between elements are discussed in the following description. It is noted that these connections are general and, unless specified otherwise, may be direct or indirect, wired or wireless, and that the specification is not intended to be limiting in this respect.

As a general introduction to the subject matter described in more detail below, aspects described herein are directed towards authentication of user data and execution of events based on the authentication. In some aspects, the scheme described herein employs a decentralized computing system for creating and managing a blockchain.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

The disclosure provided herein is described, at least in part, in relation to a decentralized peer-to-peer (e.g., P2P) system specialized for the purpose of managing a blockchain. The decentralized P2P system may be comprised of computing devices that are distributed in multiple locations across a geographical area as opposed to a single location such as a business or company. The computing devices forming the decentralized P2P system may operate with each other to manage a blockchain, which may be a data structure used to store information related to the decentralized P2P system. More specifically, the blockchain may be a chronological linkage of data elements (e.g., blocks) which store data records relating to the decentralized computing system.

A user may access the decentralized P2P system through a specialized "wallet" that serves to uniquely identify the user and enable the user to perform functions related to the decentralized P2P network. Through the wallet, the user may be able to hold tokens, funds, or any other asset associated with the decentralized P2P system. Furthermore, the user may be able to use the wallet to request performance of network-specific functions related to the decentralized P2P system such as fund, token, and/or asset transfers. The various computing devices forming the decentralized P2P computing system may operate as a team to perform network-specific functions requested by the user. In performing the network-specific functions, the various computing devices may produce blocks that store the data generated during the performance of the network-specific functions and may add the blocks to the blockchain. After the block has been added to the blockchain, the wallet associated with the user may indicate that the requested network-specific function has been performed.

For example, a user may have a wallet which reflects that the user has five tokens associated with the decentralized P2P system. The user may provide a request to the decentralized P2P system to transfer the five tokens to a friend who also has a wallet. The various computing devices forming the decentralized P2P computing system may perform the request and transfer the five tokens from the wallet of the user to the wallet of the friend. In doing so, a block may be created by the various computing devices of the decentralized P2P computing system. The block may store data indicating that the five tokens were transferred from the wallet of the user to the wallet of the friend. The various computing devices may add the block to the blockchain. At such a point, the wallet of the user may reflect the transfer of the five tokens to the wallet of the friend, and may indicate a balance of zero. The wallet of the friend, however, may also reflect the transfer of the five tokens and may have a balance of five tokens.

In more detail, the decentralized P2P system may be specialized for the purpose of managing a distributed ledger, such as a private blockchain or a public blockchain, through the implementation of digital cryptographic hash functions, consensus algorithms, digital signature information, and network-specific protocols and commands. The decentralized P2P system (e.g., decentralized system) may be comprised of decentralized system infrastructure consisting of a plurality of computing devices, either of a heterogeneous or homogenous type, which serve as network nodes (e.g., full nodes and/or lightweight nodes) to create and sustain a decentralized P2P network (e.g., decentralized network). Each of the full network nodes may have a complete replica or copy of a blockchain stored in memory and may operate in concert, based on the digital cryptographic hash functions, consensus algorithms, digital signature information, and network-specific protocols, to execute network functions and/or maintain inter-nodal agreement as to the state of the blockchain. Each of the lightweight network nodes may have at least a partial replica or copy of the blockchain stored in memory and may request performance of network functions through the usage of digital signature information, hash functions, and network commands. In executing network functions of the decentralized network, such as balance sheet transactions and smart contract operations, at least a portion of the full nodes forming the decentralized network may execute the one or more cryptographic hash functions, consensus algorithms, and network-specific protocols to register a requested network function on the blockchain. In some instances, a plurality of network function requests may be broadcasted across at least a portion of the full nodes of the decentralized network, aggregated through execution of the one or more digital cryptographic hash functions, and validated by performance of the one or more consensus algorithms to generate a single work unit (e.g., block), which may be added in a time-based, chronological manner to the blockchain through performance of network-specific protocols.

While in practice the term "blockchain" may hold a variety of contextually derived meanings, the term blockchain, as used herein, refers to a concatenation of sequentially dependent data elements (e.g., blocks) acting as a data ledger that stores records relating to a decentralized computing system. Such data records may be related to those used by a particular entity or enterprise, such as a financial institution, and/or may be associated with a particular application and/or use case including, but not limited to, cryptocurrency, digital content storage and delivery, entity authentication and authorization, digital identity, marketplace creation and operation, internet of things (e.g., IoT), prediction platforms, medical records, currency exchange and remittance, P2P transfers, ride sharing, trading platforms, and real estate, precious metal, and work of art registration and transference, among others. A "private blockchain" may refer to a blockchain of a decentralized private system in which only authorized computing devices are permitted to act as nodes in a decentralized private network and have access to the private blockchain. In some instances, the private blockchain may be viewable and/or accessible by authorized computing devices which are not participating as nodes within the decentralized private network, but still have proper credentials. A "public blockchain" may refer to a blockchain of a decentralized public system in which any computing devices may be permitted to act as nodes in a decentralized public network and have access to the public blockchain. In some instances, the public blockchain may be viewable and/or accessible by computing devices which are not participating as nodes within the decentralized public network.

Further, a "full node" or "full node computing device," as used herein, may describe a computing device in a decentralized system which operates to create and maintain a decentralized network, execute requested network functions, and maintain inter-nodal agreement as to the state of the blockchain. In order to perform such responsibilities, a computing device operating as a full node in the decentralized system may have a complete replica or copy of the blockchain stored in memory, as well as executable instructions for the execution of hash functions, consensus algorithms, digital signature information, network protocols, and network commands. A "lightweight node," "light node," "lightweight node computing device," or "light node computing device" may refer to a computing device in a decentralized system, which operates to request performance of network functions (e.g., balance sheet transactions, smart contract operations, and the like) within a decentralized network but without the capacity to execute requested network functions and maintain inter-nodal agreement as to the state of the blockchain. As such, a computing device operating as a lightweight node in the decentralized system may have a partial replica or copy of the blockchain. In some instances, network functions requested by lightweight nodes to be performed by the decentralized network may also be able to be requested by full nodes in the decentralized system.

"Network functions" and/or "network-specific functions," as described herein, may relate to functions which are able to be performed by nodes of a decentralized P2P network. In some arrangements, the data generated in performing network-specific functions may or may not be stored on a blockchain associated with the decentralized P2P network. Examples of network functions may include "smart contract operations," "balance sheet transactions," and/or user data authentication. A smart contract operation, as used herein, may describe one or more operations performed by a "smart contract," which may be one or more algorithms and/or programs associated with one or more nodes within a decentralized P2P network. A balance sheet transaction may describe one or more changes to data holdings associated with one or more nodes within a decentralized network.

In one or more aspects of the disclosure, a "digital cryptographic hash function," as used herein, may refer to any function which takes an input string of characters (e.g., message), either of a fixed length or non-fixed length, and returns an output string of characters (e.g., hash, hash value, message digest, digital fingerprint, digest, and/or checksum) of a fixed length. Examples of digital cryptographic hash functions may include BLAKE (e.g., BLAKE-256, BLAKE-512, and the like), MD (e.g., MD2, MD4, MD5, and the like), Scrypt, SHA (e.g., SHA-1, SHA-256, SHA-512, and the like), Skein, Spectral Hash, SWIFT, Tiger, and so on. A "consensus algorithm," as used herein and as described in further detail below, may refer to one or more algorithms for achieving agreement on one or more data values among nodes in a decentralized network. Examples of consensus algorithms may include proof of work (e.g., PoW), proof of stake (e.g., PoS), delegated proof of stake (e.g., DPoS), practical byzantine fault tolerance algorithm (e.g., PBFT), and so on. Furthermore, "digital signature information" may refer to one or more private/public key pairs and digital signature algorithms which are used to digitally sign a message and/or network function request for the purposes of identity and/or authenticity verification. Examples of digital signature algorithms which use private/public key pairs contemplated herein may include public key infrastructure (PKI), Rivest-Shamir-Adleman signature schemes (e.g., RSA), digital signature algorithm (e.g., DSA), Edwards-curve digital signature algorithm, and the like. A "wallet," as used herein, may refer to one or more data and/or software elements (e.g., digital cryptographic hash functions, digital signature information, and network-specific commands) that allow a node in a decentralized P2P network to interact with the decentralized P2P network.

As will be described in further detail below, a decentralized P2P system implementing a blockchain data structure may provide solutions to technological problems existing in current centralized system constructs with traditional data storage arrangements. For example, conventional data storage arrangements that use a central data authority have a single point of failure (namely, the central storage location) which, if compromised by a malicious attacker, can lead to data tampering, unauthorized data disclosure, and exploitation and/or loss of operative control of the processes performed by the centralized system. The implementation of a blockchain data structure in a decentralized P2P system acts as a safeguard against unreliable and/or malicious nodes acting in the decentralized P2P network to undermine the work efforts of the other nodes, e.g., by providing byzantine fault tolerance within the network.

Computing Architectures

FIG. 1 depicts an illustrative example of centralized computer system 100 in accordance with one or more illustrative aspects described herein. Centralized computer system 100 may comprise one or more computing devices including at least server infrastructure 110 and user computing devices 120. Each of user computing devices 120 may be configured to communicate with server infrastructure 110 through network 130. In some arrangements, centralized computer system 100 may include additional computing devices and networks that are not depicted in FIG. 1, which also may be configured to interact with server infrastructure 110 and, in some instances, user computing devices 120.

Server infrastructure 110 may be associated with a distinct entity such as a company, school, government, and the like, and may comprise one or more personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), and the like. Server infrastructure 110 may include computing hardware and software that may host various data and applications for performing tasks of the centralized entity and interacting with user computing devices 120, as well as other computing devices. For example, each of the computing devices comprising server infrastructure 110 may include at least one or more processors 112 and one or more databases 114, which may be stored in memory of the one or more computing devices of server infrastructure 110. Through execution of computer-readable instructions stored in memory, the computing devices of server infrastructure 110 may be configured to perform functions of the centralized entity and store the data generated during the performance of such functions in databases 114.

In some arrangements, server infrastructure 110 may include and/or be part of enterprise information technology infrastructure and may host a plurality of enterprise applications, enterprise databases, and/or other enterprise resources. Such applications may be executed on one or more computing devices included in server infrastructure 110 using distributed computing technology and/or the like. In some instances, server infrastructure 110 may include a relatively large number of servers that may support operations of a particular enterprise or organization, such as a financial institution. Server infrastructure 110, in this embodiment, may generate a single centralized ledger for data received from the various user computing devices 120, which may be stored in databases 114.

Each of the user computing devices 120 may be configured to interact with server infrastructure 110 through network 130. In some instances, one or more of the user computing devices 120 may be configured to receive and transmit information corresponding to system requests through particular channels and/or representations of webpages and/or applications associated with server infrastructure 110. The system requests provided by user computing devices 120 may initiate the performance of particular computational functions such as data and/or file transfers at server infrastructure 110. In such instances, the one or more of the user computing devices may be internal computing devices associated with the particular entity corresponding to server infrastructure 110 and/or may be external computing devices which are not associated with the particular entity.

As stated above, centralized computer system 100 also may include one or more networks, which may interconnect one or more of server infrastructure 110 and one or more user computing devices 120. For example, centralized computer system 100 may include network 130. Network 130 may include one or more sub-networks (e.g., local area networks (LANs), wide area networks (WANs), or the like). Furthermore, centralized computer system 100 may include a local network configured to interconnect each of the computing devices comprising server infrastructure 110.

Furthermore, in some embodiments, centralized computer system 100 may include a plurality of computer systems arranged in an operative networked communication with one another through a network, which may interface with server infrastructure 110, user computing devices 120, and network 130. The network may be a system specific distributive network receiving and distributing specific network feeds and identifying specific network associated triggers. The network may also be a global area network (GAN), such as the Internet, a wide area network (WAN), a local area network (LAN), or any other type of network or combination of networks. The network may provide for wireline, wireless, or a combination wireline and wireless communication between devices on the network.

In the centralized computer system 100 described in regard to FIG. 1, server infrastructure 110 may serve as a central authority which manages at least a portion of the computing data and actions performed in relation to the particular entity associated with server infrastructure 110. As such, server infrastructure 110 of centralized computer system 100 provides a single point of failure which, if compromised by a malicious attacker, can lead to data tampering, unauthorized data disclosure, and exploitation and/or loss of operative control of the processes performed by the server infrastructure 110 in relation to the particular entity associated with server infrastructure 110. In such a centralized construct in which a single point of failure (e.g., server infrastructure 110) is created, significant technological problems arise regarding maintenance of operation and data control, as well as preservation of data integrity. As will be described in further detail below in regard to FIG. 2, such technological problems existing in centralized computing arrangements may be solved by a decentralized P2P system implementing a blockchain data structure, even wholly within the server infrastructure 110.

Figure 2:
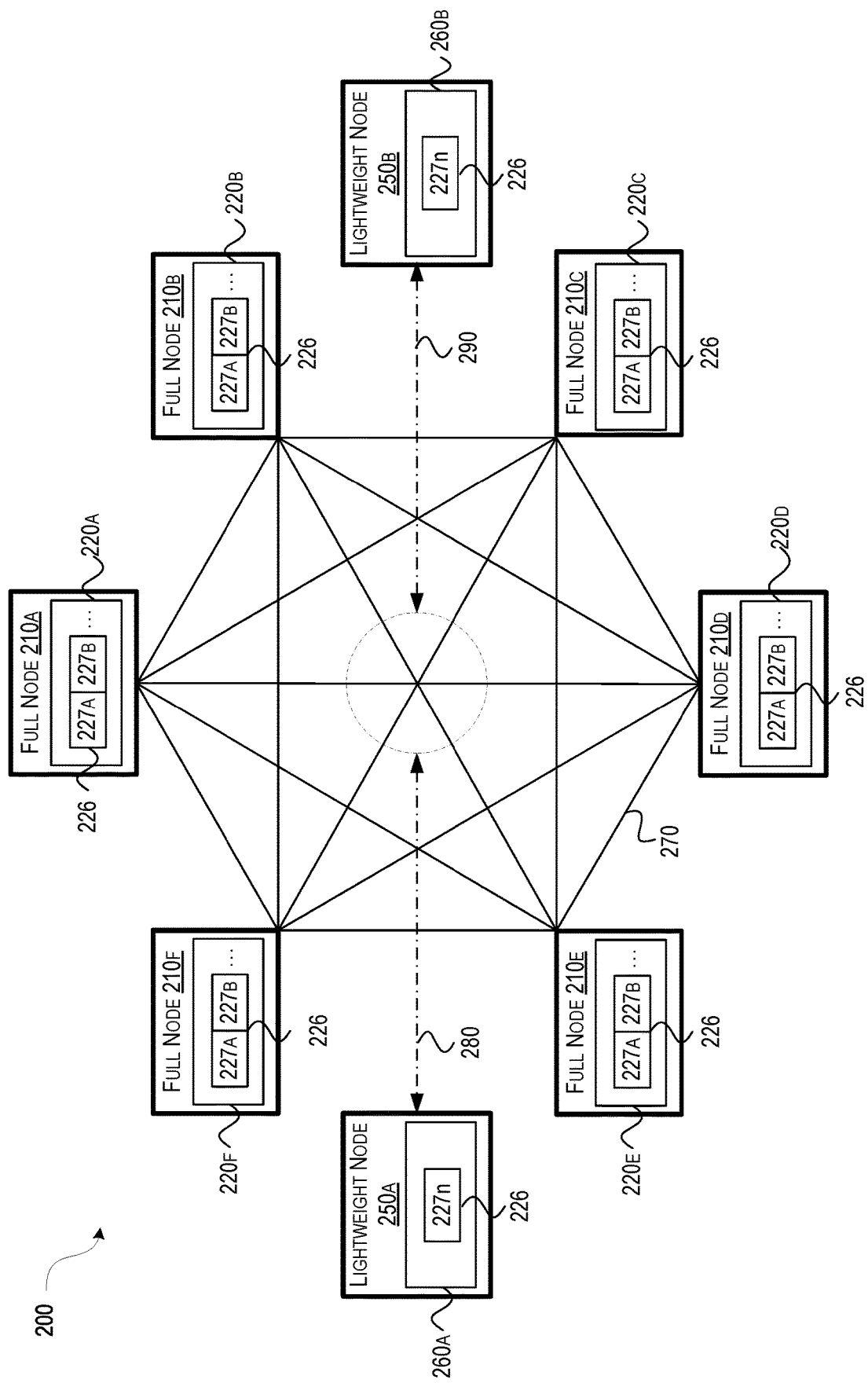
FIG. 2 depicts an illustrative example of a decentralized P2P computer system that may be used in accordance with one or more illustrative aspects described herein.

FIG. 2 depicts an illustrative example of decentralized P2P computer system 200 that may be used in accordance with one or more illustrative aspects described herein. Decentralized P2P computer system 200 may include a plurality of full node computing devices 210A, 210B, 210C, 210D, 210E, and 210F and lightweight node computing devices 250A and 250B, which may be respectively similar to full node computing device 210 described in regard to FIG. 3A and lightweight node computing device 250 described in regard to FIG. 3B. While a particular number of full node computing devices and lightweight node computing devices are depicted in FIG. 2, it should be understood that a number of full node computing devices and/or lightweight node computing devices greater or less than that of the depicted full node computing devices and lightweight node computing devices may be included in decentralized P2P computer system 200. Accordingly, any additional full node computing devices and/or lightweight node computing devices may respectively perform in the manner described below in regard to full node computing devices 210A-210F and lightweight node computing devices 250A and 250B in decentralized P2P computer system 200.

Each of full node computing devices 210A-210F may operate in concert to create and maintain decentralized P2P network 270 of decentralized P2P computer system 200. In creating decentralized P2P network 270 of decentralized P2P computer system 200, processors, ASIC devices, and/or graphics processing units (e.g., GPUs) of each full node computing device 210A-210F may execute network protocols which may cause each full node computing device 210A-210F to form a communicative arrangement with the other full node computing devices 210A-210F in decentralized P2P computer system 200. Furthermore, the execution of network protocols by the processors, ASIC devices, and/or graphics processing units (e.g., GPUs) of full node computing devices 210A-210F may cause full node computing devices 210A-210F to execute network functions related to blockchain 226 and thereby maintain decentralized P2P network 270.

Lightweight node computing devices 250A and 250B may request execution of network functions related to blockchain 226 in decentralized P2P network 270. In order to request execution of network functions, such as balance sheet transaction and/or smart contract operations, processors of lightweight node computing devices 250A and 250B may execute network commands to broadcast the network functions to decentralized P2P network 270 comprising full node computing devices 210A-210F.

For example, lightweight node computing device 250A may request execution of a balance sheet transaction related to blockchain 226 in decentralized P2P network 270, which may entail a data transfer from a private/public key associated with lightweight node computing device 250A to a private/public key associated with lightweight node 250B. In doing so, processors of lightweight node computing device 250A may execute network commands to broadcast balance sheet transaction network function request 280 to decentralized P2P network 270. Balance sheet transaction network function request 280 may include details about the data transfer such as data type and amount, as well as a data transfer amount to full node computing devices 210A-201F of decentralized P2P network 270 for executing balance sheet transaction network function request 280. Balance sheet transaction network function request 280 may further include the public key associated with lightweight node computing device 250B. Processors of lightweight node computing device 250A may execute digital signature algorithms to digitally sign balance sheet transaction network function request 280 with the private key associated with lightweight node computing device 250A.

At decentralized P2P network 270, balance sheet transaction network function request 280 may be broadcasted to each of full node computing devices 210A-210F through execution of network protocols by full node computing devices 210A-210F. In order to execute balance sheet transaction network function request 280 and maintain internodal agreement as to the state of blockchain 226, processors, ASIC devices, and/or GPUs of full node computing devices 210A-210F may execute network protocols to receive the broadcast of the network function through a decentralized P2P network 270 and from lightweight node computing device 250A. Processors, ASIC devices, and/or GPUs of full node computing devices 210A-210F may execute hash functions to generate a digest of balance sheet transaction network function request 280. The resultant digest of balance sheet transaction network function request 280, in turn, may be hashed with the block hash of the most immediately preceding block of blockchain 226. Processors, ASIC devices, and/or GPUs of full node computing devices 210A-210F may execute consensus algorithms to identify a numerical value (e.g., nonce) corresponding to the particular executed consensus algorithm and related to the digest that combines the digest of the balance sheet transaction network function request 280 and the block hash of the most immediately preceding block of blockchain 226.

For example, in embodiments in which the consensus algorithm is proof of work (e.g., PoW), processors, ASIC devices, and/or GPUs of full node computing devices 210A-210F may perform a plurality of hashing operations to identify a nonce that, when hashed with the digest that combines the digest of the balance sheet transaction network function request 280 and the block hash of the most immediately preceding block of blockchain 226, produces a hash of a predetermined alphanumerical format. Such a predetermined alphanumerical format may include a predetermined number of consecutive alphanumerical characters at a predetermined position within the resultant digest that combines the nonce, digest of the balance sheet transaction network function request 280, and block hash of the most immediately preceding block of blockchain 226.

In embodiments in which the consensus algorithm is proof of stake (e.g., PoS), a private key associated with one of full node computing devices 210A-210F may be pseudo-randomly selected, based on balance sheet holdings associated with the public keys of full node computing devices 210A-210F, to serve as the nonce. For example, through execution of the PoS consensus algorithm, full node computing devices 210A-210F are entered into a lottery in which the odds of winning are proportional to a balance sheet amount associated with the public key of each of full node computing devices 210A-210F, wherein a larger balance sheet amount corresponds to a higher probability to win the lottery. The PoS consensus algorithm may cause a full node computing device from full node computing devices 210A-210F to be selected, and the public key of the selected full node computing device to be used as the nonce.

In embodiments in which the consensus algorithm is delegated proof of stake (e.g., DPoS), a group of delegates are chosen from full node computing devices 210A-210F by each of computing devices 210A-210F, wherein full node computing devices 210A-210F are allowed to vote on delegates based on balance sheet holdings associated with the respective public keys. Full node computing devices 210A-210F, however, may not vote for themselves to be delegates. Once the group of delegates are chosen, the group of delegates from full node computing devices 210A-210F select a public key associated with one of full node computing devices 210A-210F to serve as the nonce. Again, each of the delegates are prohibited from selecting themselves and their respective public key from serving as the nonce.

In embodiments in which the consensus algorithm is practical byzantine fault tolerance algorithm (e.g., PBFT), each of full node computing devices 210A-210F are associated with a particular status and/or ongoing specific information associated with the respective public key of the full node computing devices. Each of full node computing devices 210A-210F receive a message through decentralized P2P network 270 based on network protocols. Based on the received message and particular status and/or ongoing specific information, each of full node computing devices 210A-210F perform computational tasks and transmit a response to the tasks to each of the other full node computing devices 210A-210F. A public key associated with a particular full node computing device from full node computing devices 210A-210F is selected by each of full node computing devices 210A-210F based on the response of the particular full node computing device best fulfilling criteria determined based on the network protocols.

The identification of the nonce enables processors, ASIC devices, and/or GPUs of the full node computing device from full node computing devices 210A-210F to create a new block with a block header (e.g., block hash), which is a digest that combines the digest of balance sheet transaction network function request 280, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase a balance sheet holdings amount associated with itself by a predetermined amount. In some arrangements, each of full node computing devices 210A-210F may receive an equal portion of the data transfer amount specified by lightweight node computing device 260A for executing balance sheet transaction network function request 280. After the new block has been added to blockchain 226, balance sheet transaction network function request 280 may be considered to be executed and the data transfer from the private/public key associated with lightweight node computing device 250A to the private/public key associated with lightweight node 250B may be registered.

As stated above, in some arrangements, a plurality of network function requests may be broadcasted across decentralized network P2P network 270. Processors, ASIC devices, and/or GPUs of full node computing devices 210A-210F may execute network protocols to receive broadcast of each of the network functions, including balance sheet transaction network function request 280, through decentralized P2P network 270 and from the requesting entities, including lightweight node computing device 250A. Processors, ASIC devices, and/or GPUs of full node computing devices 210A-210F may execute hash functions to generate a hash tree (e.g., Merkle tree) of the requested network functions, which culminates in a single digest (e.g., root digest, root hash, and the like) that comprises the digests of each of the requested network functions, including balance sheet transaction network function request 280. The root digest of the requested network function, in turn, may be hashed with the block hash of the most immediately preceding block of blockchain 226. Processors, ASIC devices, and/or GPUs of full node computing devices 210A-210B may execute consensus algorithms in the manner described above to identify a nonce corresponding to the particular executed consensus algorithm and related to the digest that combines the root digest of the requested network functions and the block hash of the most immediately preceding block of blockchain 226. The identification of the nonce enables processors, ASIC devices, and/or GPUs of the full node computing device from full node computing devices 210A-210F to create a new block with a block header (e.g., block hash), which is a digest that combines the root digest of the network function requests, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase a balance sheet holdings amount associated with itself by a predetermined amount. In some arrangements, each of full node computing devices 210A-210F may receive an equal portion of the data transfer amount specified by each of the network function requests. After the new block has been added to blockchain 226, each of the network functions requests, including balance sheet transaction network function request 280, may be considered to be executed and the data transfer from the private/public key associated with lightweight node computing device 250A to the private/public key associated with lightweight node 250B may be registered.

While the description provided above is made in relation to a balance sheet transaction involving lightweight node computing device 250A and lightweight node computing device 250B, it is to be understood that balance sheet transactions are not limited to lightweight node computing device 250A and lightweight node computing device 250B, but rather may be made across any of the full node computing devices and/or lightweight node computing devices in decentralized P2P system 200.

For another example, lightweight node computing device 250B may request a smart contract operation related to blockchain 226 in decentralized P2P network 270, which may facilitate a dual data transfer between a private/public key associated with lightweight node computing device 250B and a private/public key associated lightweight node computing device 250A. Processors of lightweight node computing device 250B may execute network commands to broadcast smart contract operation network function request 290 to decentralized P2P network 270. Smart contract operation network function request 290 may include details about the data transfer such as data type and amount, as well as a data transfer amount to full node computing devices 210A-210F of decentralized P2P network 270 for executing smart contract operation network function request 290. Smart contract operation network function request 290 may further include the public key associated with the smart contract. Processors of lightweight node computing device 250B may execute digital signature algorithms to digitally sign smart contract operation network function request 290 with the private key associated with lightweight node computing device 250B.

At decentralized P2P network 270, smart contract operation network function request 290 may be broadcasted to each of full node computing devices 210A-210F through execution of network protocols by full node computing devices 210A-210F. In order to execute smart contract operation network function request 290 and maintain inter-nodal agreement as to the state of blockchain 226, processors, ASIC devices, and/or GPUs of full node computing devices 210A-210F may execute network protocols to receive broadcast of the network function through a decentralized P2P network 270 and from lightweight node computing device 250B. Processors, ASIC devices, and/or GPUs of full node computing devices 210A-210F may execute hash functions to generate a digest of smart contract operation network function request 290. The resultant digest of smart contract operation network function request 290, in turn, may be hashed with the block hash of the most immediately preceding block of blockchain 226. Processors, ASIC devices, and/or GPUs of full node computing devices 210A-210F may execute consensus algorithms to identify a nonce corresponding to the particular executed consensus algorithm and related to the digest that combines the digest of smart contract operation network function request 290 and the block hash of the most immediately preceding block of blockchain 226.

The identification of the nonce enables processors, ASIC devices, and/or GPUs of the full node computing device from full node computing devices 210A-210F to create a new block with a block header (e.g., block hash), which is a digest that combines smart contract operation network function request 290, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be timestamped at a time corresponding to the addition to blockchain 226. Furthermore, as a reward for adding the new block to blockchain 226, the full node computing device from full node computing devices 210A-210F may, per the network protocols, increase a balance sheet holdings amount associated with itself by a predetermined amount. In some arrangements, each of full node computing devices 210A-210F may receive an equal portion of the data transfer amount specified by lightweight node computing device 260A for executing smart contract operation network function request 290. After the new block has been added to blockchain 226, smart contract operation request 290 may be considered to be executed and the data transfer from the private/public key associated with lightweight node computing device 250B to the private/public key associated with the smart contract may be registered.

The smart contract may be configured to hold the data transfer from the private/public key associated with lightweight node computing device 250B until fulfillment of certain predetermined criteria hardcoded into the smart contract is achieved. The smart contract may be configured such that it serves as an intermediate arbiter between entities within the decentralized P2P network 270 and may specify details of a dual data transfer between entities.

Lightweight node computing device 250A may also request a smart contract operation related to blockchain 226 in decentralized P2P network 270, which may conclude the dual data transfer between a private/public key associated lightweight node computing device 250A and a private/public key associated with lightweight node computing device 250B. Processors of lightweight node computing device 250A may execute network commands to broadcast the smart contract operation network function request to decentralized P2P network 270. The smart contract operation network function request may include details about the data transfer such as data type and amount, as well as a data transfer amount to full node computing devices 210A-210F of decentralized P2P network 270 for executing the smart contract operation network function request. The smart contract operation network function request may further include the public key associated with the smart contract. Processors of lightweight node computing device 250A may execute digital signature algorithms to digitally sign the smart contract operation network function request with the private key associated with lightweight node computing device 250A.

At decentralized P2P network 270, the smart contract operation network function request may be broadcasted to each of full node computing devices 210A-210F through execution of network protocols by full node computing devices 210A-210F. In order to execute the smart contract operation network function request and maintain inter-nodal agreement as to the state of blockchain 226, processors, ASIC devices, and/or GPUs of full node computing devices 210A-210F may execute network protocols to receive broadcast of the network function through a decentralized P2P network 270 and from lightweight node computing device 250A. Processors, ASIC devices, and/or GPUs of full node computing devices 210A-210F may execute hash functions to generate a digest of the smart contract operation network function request. The resultant digest of the smart contract operation network function request, in turn, may be hashed with the block hash of the most immediately preceding block of blockchain 226. Processors, ASIC devices, and/or GPUs of full node computing devices 210A-210F may execute consensus algorithms to identify a nonce corresponding to the particular executed consensus algorithm and related to the digest that combines the digest of the smart contract operation network function request and the block hash of the most immediately preceding block of blockchain 226.

The identification of the nonce enables processors, ASIC devices, and/or GPUs of the full node computing device from full node computing devices 210A-210F to create a new block with a block header (e.g., block hash), which is a digest that combines the smart contract operation network function request, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase a balance sheet holdings amount associated with itself by a predetermined amount. In some arrangements, each of full node computing devices 210A-210F may receive an equal portion of the data transfer amount specified by lightweight node computing device 260A for executing the smart contract operation network function request. After the new block has been added to blockchain 226, the smart contract operation transaction network function request 290 may be considered to be executed and the data transfer from the private/public key associated with lightweight node computing device 250A to the private/public key associated with the smart contract may be registered.

When the smart contract receives the data value from each of lightweight node computing device 250A and lightweight node computing device 250B, the smart contract may transfer the data value from lightweight node computing device 250A to lightweight node computing device 250B and the data value from lightweight node computing device 250B to lightweight node computing device 250A.

While the description provided above was made in relation to lightweight node computing device 250A and lightweight node computing device 250B, it should be understood that any of the full node computing devices and lightweight node computing devices in decentralized system 200 may participate in the smart contract. Furthermore, it should be understood that the smart contract may be able to fulfill dual data transfers in the manner described above across a plurality of entities entering into the smart contract. For example, a first plurality of entities may enter into the smart contract, which may hold the data values for each of the first plurality of entities until a second plurality of entities enter into the smart contract. When each of the first plurality of entities and the second plurality of entities have entered, the smart contract may perform the data transfer.

In comparison to the centralized computing system 100 described in regard to FIG. 1, decentralized P2P computer system 200 may provide technological advantages. For example, by distributing storage of blockchain 226 across multiple full node computing devices 210A-210F, decentralized P2P computer system 200 may not provide a single point of failure for malicious attack. In the event that any of the full node computing devices 210A-210F are compromised by a malicious attacker, decentralized P2P computer system 200 may continue to operate unabated as data storage of blockchain 226 and network processes are not controlled by a singular entity such as server infrastructure 110 of centralized computing system 100.

Furthermore, by utilizing blockchain data structure 226, decentralized P2P system 200 may provide technological improvements to conventional decentralized P2P systems in regard to byzantine fault tolerance stemming from an unreliable and/or malicious full node acting in decentralized P2P network 270 to undermine the work efforts of the other nodes. For example, in coordinating action between full node computing devices 210A-210F in relation to a similar computational task (e.g., consensus algorithm), a malicious node would need to have computational power greater than the combined computational power of each of the other full node computing devices in decentralized P2P network 270 to identify the nonce and thereby be able to modify blockchain 226. As such, the likelihood that a malicious node could subvert decentralized P2P network 270 and enter falsified data into blockchain 270 is inversely proportional to the total computational power of decentralized P2P system 200. Therefore, the greater the total computational power of decentralized P2P system 200, the less likely that a malicious node could subvert decentralized P2P network 270 and undermine blockchain 226.

Figure 3:
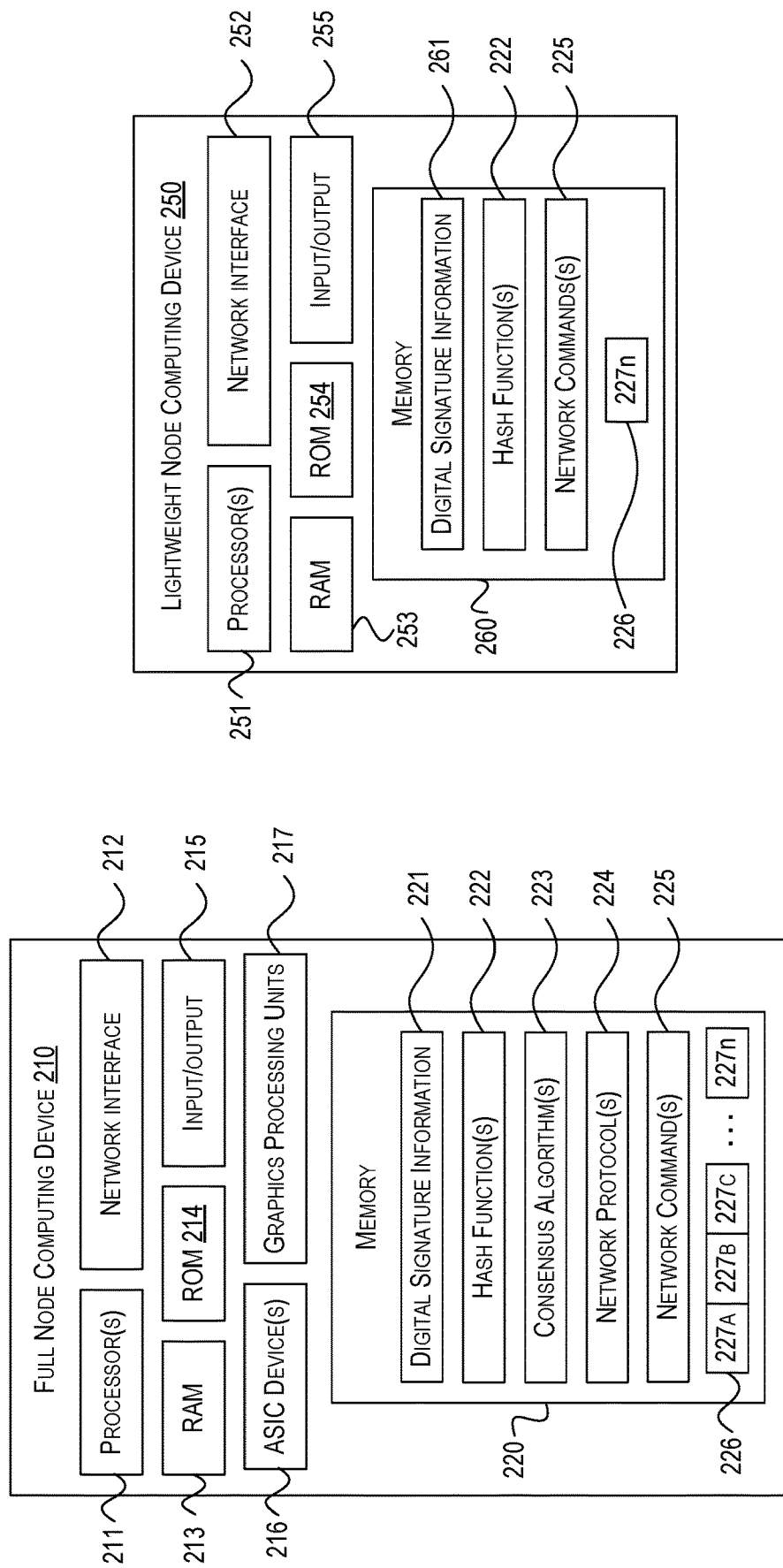
FIG. 3A depicts an illustrative example of a full node computing device that may be used in accordance with one or more illustrative aspects described herein.
FIG. 3B depicts an illustrative example of a lightweight node computing device that may be used in accordance with one or more illustrative aspects described herein.

FIG. 3A depicts an illustrative example of a full node computing device 210 that may be used in accordance with one or more illustrative aspects described herein. Full node computing device 210 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, and the like and may operate in a decentralized P2P network. In some embodiments, full node computing device 210 may be configured to operate in a decentralized P2P network and may request execution of network functions and/or to execute requested network functions and maintain inter-nodal agreement as to the state of a blockchain of the decentralized P2P network.

Full node computing device 210 may include one or more processors 211, which control overall operation, at least in part, of full node computing device 210. Full node computing device 210 may further include random access memory (RAM) 213, read only memory (ROM) 214, network interface 212, input/output interfaces 215 (e.g., keyboard, mouse, display, printer), and memory 220. Input/output (I/O) 215 may include a variety of interface units and drives for reading, writing, displaying, and/or printing data or files. In some arrangements, full node computing device 210 may further comprise specialized hardware components such as application-specific integrated circuit (e.g., ASIC) devices 216 and/or graphics processing units (e.g., GPUs) 217. Such specialized hardware components may be used by full node computing device 210 in performing one or more of the processes involved in the execution of requested network functions and maintenance of inter-nodal agreement as to the state of a blockchain. Full node computing device 210 may further store in memory 220 operating system software for controlling overall operation of the full node computing device 210, control logic for instructing full node computing device 210 to perform aspects described herein, and other application software providing secondary, support, and/or other functionality which may or might not be used in conjunction with aspects described herein.

Memory 220 may also store data and/or computer executable instructions used in performance of one or more aspects described herein. For example, memory 220 may store digital signature information 221 and one or more hash functions 222, consensus algorithms 223, network protocols 224, and network commands 225. In some arrangements, digital signature information 221, hash functions 222, and/or network commands 225 may comprise a wallet of full node computing device 210. Memory 220 may further store blockchain 226. Each of digital signature information 221, hash functions 222, consensus algorithms 223, network protocols 224, and network commands 225 may be used and/or executed by one or more processors 211, ASIC devices 216, and/or GPUs 217 of full node computing device 210 to create and maintain a decentralized P2P network, request execution of network functions, and/or execute requested network functions and maintain inter-nodal agreement as to the state of blockchain 226.

For example, in order to create and maintain a decentralized P2P network, processors 211, ASIC devices 216, and/or GPUs 217 of full node computing device 210 may execute network protocols 225. Execution of network protocols 225 may cause full node computing device 210 to form a communicative arrangement with other full node computing devices and thereby create a decentralized P2P network. Furthermore, the execution of network protocols 225 may cause full node computing device 210 to maintain the decentralized P2P network through the performance of computational tasks related to the execution of network requests related to a blockchain such as blockchain 226. As will be described in detail below, the execution of such computational tasks (e.g., hash functions 222, consensus algorithms 223, and the like) may cause full node computing device 210 to maintain inter-nodal agreement as to the state of a blockchain with other full node computing devices comprising the decentralized P2P network.

In order to request execution of network functions, such as balance sheet transactions and/or smart contract operations, processors 211, ASIC devices 216, and/or GPUs 217 of full node computing device 210 may execute network commands 225 to broadcast the network function to a decentralized P2P network comprising a plurality of full nodes and/or lightweight nodes. The request may be digitally signed by full node computing device 210 with usage of the private/public key information and through execution of the digital signature algorithms of digital signature information 221.

In order to execute requested network functions and maintain inter-nodal agreement as to the state of a blockchain, processors 211, ASIC devices 216, and/or GPUs 217 of full node computing device 210 may execute network protocols 224 to receive a broadcast of a requested network function through a decentralized P2P network and from a requesting entity such as a full node or lightweight node. Processors 211, ASIC devices 216, and/or GPUs 217 of full node computing device 210 may execute hash functions 222 to generate a digest of the requested network function. The resultant digest of the requested network function, in turn, may be hashed with the block hash of the most immediately preceding block of the blockchain. As will be described in further detail below, processors 211, ASIC devices 216, and/or GPUs 217 of full node computing device 210 may execute consensus algorithms 223 to identify a numerical value (e.g., nonce) corresponding to the particular executed consensus algorithm and related to the digest that combines the digest of the requested network function and the block hash of the most immediately preceding block of the blockchain. The identification of the numerical value enables processors 211, ASIC devices 216, and/or GPUs 217 of full node computing device 210 to create a new block with a block header (e.g., block hash), which is a digest that combines the digest of the requested network function, the block hash of the most immediately preceding block, and the identified nonce. Processors 211, ASIC devices 216, and/or GPUs 217 of full node computing device 210 may add the new block to the blockchain based on network protocols 224 and broadcast the new block to the other nodes in the decentralized P2P network.

As stated above, in some arrangements, a plurality of network function requests may be broadcasted across the decentralized network P2P network. Processors 211, ASIC devices 216, and/or GPUs 217 of full node computing device 210 may execute network protocols 224 to receive broadcast of each of the network functions through the decentralized P2P network and from the requesting entities. Processors 211, ASIC devices 216, and/or GPUs 217 of full node computing device 210 may execute hash functions 222 to generate a hash tree (e.g., Merkle tree) of the requested network functions, which culminates in a single digest (e.g., root digest, root hash, and the like) that comprises the digests of each of the requested network functions. The root digest of the requested network function, in turn, may be hashed with the block hash of the most immediately preceding block of the blockchain. Processors 211, ASIC devices 216, and/or GPUs 217 of full node computing device 210 may execute consensus algorithms 223 to identify a numerical value (e.g., nonce) corresponding to the particular executed consensus algorithm and related to the digest that combines the root digest of the requested network functions and the block hash of the most immediately preceding block of the blockchain. The identification of the numerical value enables processors 211, ASIC devices 216, and/or GPUs 217 of full node computing device 210 to create a new block with a block header (e.g., block hash), which is a digest that combines the root digest of the requested network functions, the block hash of the most immediately preceding block, and the identified nonce. Processors 211, ASIC devices 216, and/or GPUs 217 of full node computing device 210 may add the new block to the blockchain based on network protocols 224 and broadcast the new block to the other nodes in the decentralized P2P network.

Furthermore, memory 220 of full node computing device 210 may store blockchain 226. Blockchain 226 may include a blocks 227A, 227B, 227C, . . . 227n, wherein block 227A represents the first block (e.g., genesis block) of blockchain 226 and block 227n represents the most immediate block of blockchain 226. As such, the blockchain 226, which may be a replica or copy of the blockchain of the decentralized P2P network in which full node computing device 210 operates, may be a full or complete copy of the blockchain of the decentralized P2P network. Each of the blocks within blockchain 226 may include information corresponding to the one or more network functions executed by the decentralized P2P network. As such, blockchain 226 as stored in memory 220 of full node computing device 210 may comprise the totality of network functions executed by the decentralized network.

FIG. 3B depicts an illustrative example of a lightweight node computing device 250 that may be used in accordance with one or more illustrative aspects described herein. Lightweight node computing device 250 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, and the like and may operate in a decentralized P2P network. In some embodiments, lightweight node computing device 250 may operate in a decentralized P2P network and may be configured to request execution of network functions through the decentralized P2P network. As such, lightweight node computing device 250 may be different from full node computing device 210 in that it is not configured to execute network functions and/or operate to maintain a blockchain of a decentralized P2P network. In other aspects, lightweight node computing device 250 may have substantially the same physical configuration as full node computing device 210, but configured with different programs, software.

Lightweight node computing device 250 may include one or more processors 251, which control overall operation of lightweight node computing device 250. Lightweight node computing device 250 may further include random access memory (RAM) 253, read only memory (ROM) 254, network interface 252, input/output interfaces 255 (e.g., keyboard, mouse, display, printer), and memory 260. Input/output (I/O) 255 may include a variety of interface units and drives for reading, writing, displaying, and/or printing data or files. Lightweight node computing device 250 may store in memory 260 operating system software for controlling overall operation of the lightweight node computing device 250, control logic for instructing lightweight node computing device 250 to perform aspects described herein, and other application software providing secondary, support, and/or other functionality which may or might not be used in conjunction with aspects described herein.

In comparison to full node computing device 210, lightweight node computing device 250 might not include, in some instances, specialized hardware such as ASIC devices 216 and/or GPUs 217. Such is the case because lightweight node computing device 250 might not be configured to execute network functions and/or operate to maintain a blockchain of a decentralized P2P network as is full node computing device 210. However, in certain arrangements, lightweight node computing device 250 may include such specialized hardware.

Memory 260 of lightweight node computing device 250 may also store data and/or computer executable instructions used in performance of one or more aspects described herein. For example, memory 260 may store digital signature information 261 and one or more hash functions 222 and network commands 225. In some arrangements, digital signature information 261, hash functions 222, and/or network commands 225 may comprise a wallet of lightweight node computing device 250. Each of hash functions 222 and network commands 225 stored in memory 260 of lightweight node computing device 250 may be respectively similar and/or identical to hash functions 222 network commands 225 stored in memory 220 of full node computing device 210.

In regard to the digital signature information, each of digital signature information 261 stored in memory 260 of lightweight node computing device 250 and digital signature information 221 stored in memory 220 of full node computing device 210 may comprise similar and/or identical digital signature algorithms. However, the private/public key information of digital signature information 261 stored in memory 260 of lightweight node computing device 250 may be different from that of the private/public key information of digital signature information 221 stored in memory 220 of full node computing device 210. Furthermore, the private/public key information of each node, whether full or lightweight, in a decentralized P2P computing network may be unique to that particular node. For example, a first node in a decentralized P2P computing network may have first private/public key information, a second node may have second private/public key information, a third node may have third private/public key information, and so on, wherein each of the private/public key information is unique to the particular node. As such, the private/public key information may serve as a unique identifier for the nodes in a decentralized P2P computing network.

Each of digital signature information 261, hash functions 222, and network commands 225 may be used and/or executed by one or more processors 251 of lightweight node computing device 250 to request execution of network functions in a decentralized P2P network. For example, in order to request execution of network functions, such as balance sheet transactions and/or smart contract operations, processors 251 of lightweight node computing device 250 may execute network commands 225 to broadcast the network function to a decentralized P2P network comprising a plurality of full nodes and/or lightweight nodes. The request may be digitally signed by lightweight node computing device 250 with usage of the private/public key information and through execution of the digital signature algorithms of digital signature information 261.

Furthermore, memory 260 of lightweight node computing device 250 may store blockchain 226. Blockchain 226 stored in memory 260 of lightweight node computing device 250 may include at least block 227n, wherein block 227n represents the most immediate block of blockchain 226. As such, the blockchain 226, which may be a replica or copy of the blockchain of the decentralized P2P network in which lightweight node computing device 250 operates, may be a partial or incomplete copy of the blockchain of the decentralized P2P network. In some instances, however, blockchain 226 may include a blocks 227A, 227B, 227C, . . . 227n, wherein block 227A represents the first block (e.g., genesis block) of blockchain 226 and block 227n represents the most immediate block of blockchain 226. As such, the blockchain 226 may be a full or complete copy of the blockchain of the decentralized P2P network. Each of the blocks within blockchain 226 may include information corresponding to the one or more network functions executed by the decentralized P2P network.

User Data Authentication and Event Execution

Figure 4:
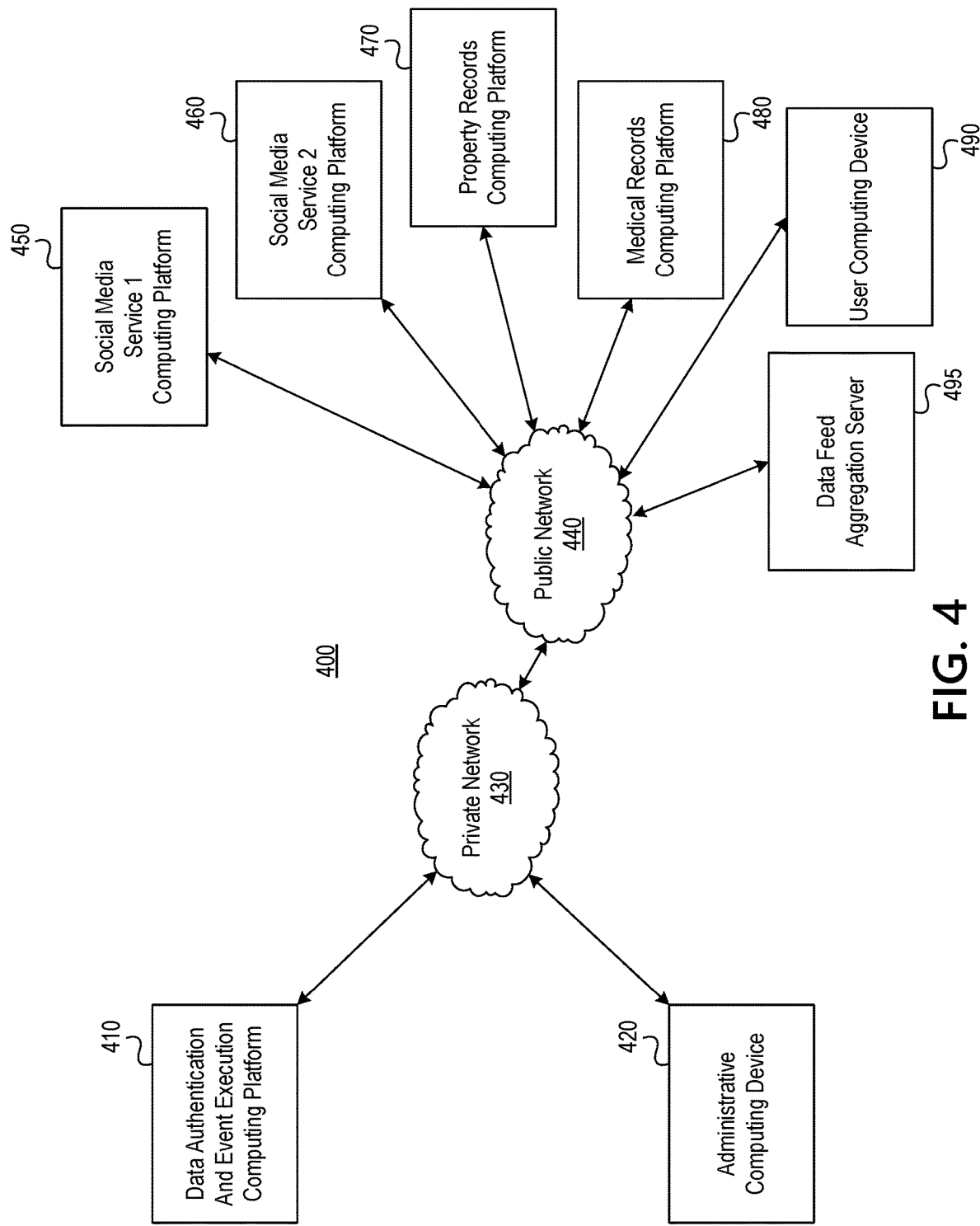
FIG. 4 depicts an illustrative computing environment for authentication of user data and execution of events based on the authentication in accordance with one or more example embodiments.

FIG. 4 depicts an illustrative computing environment for authentication of user data and execution of events based on the authentication in accordance with one or more example embodiments. Referring to FIG. 4, computing environment 400 may include one or more computer systems, one or more computer networks, and/or other computing infrastructure. For example, computing environment 400 may include a data authentication and event execution computing platform 410, an administrative computing device 420, a private network 430, a public network 440, a first social media service computing platform 450, a second social media service computing platform 460, property records computing platform 470, medical records computing platform 480, user computing device 490, and data feed aggregation server 495.

In addition to performing specific functions detailed further below, each of data authentication and event execution computing platform 410, administrative computing device 420, first social media service computing platform 450, second social media service computing platform 460, property records computing platform 470, medical records computing platform 480, user computing device 490, and data feed aggregation server 495 may function as full node computing devices 210 or as lightweight node computing devices 250 to authenticate various types of user data, add the authenticated data to a given user's blockchain (e.g., after cryptographically hashing the authenticated data), maintain a copy of the current state of the user's blockchain, execute events related to the authenticated data when the data is part of a smart contract, and communicate with other network nodes functioning as lightweight node computing devices 250. In one embodiment, data authentication and event execution computing platform may function as a full node computing device 210 and first social media service computing platform 450, second social media service computing platform 460, property records computing platform 470, medical records computing platform 480, user computing device 490, and data feed aggregation server 495 may function as lightweight node computing devices 250.

In other embodiments, more than one platform in computing environment 400 may function as a full node computing device 210. For example, data authentication and event execution computing platform 410, first social media service computing platform 450, and second social media service computing platform 460 may all function as full node computing devices 210 in computing environment 400. In this example, data authentication and event execution computing platform 410, first social media service computing platform 450, and second social media service computing platform 460 may all operate to create and maintain a decentralized network, execute requested network functions related to user data authentication and event execution, maintain inter-nodal agreement as to the state of the user's blockchain, and execute events related to the user data. In order to perform these functions, data authentication and event execution computing platform 410, first social media service computing platform 450, and second social media service computing platform 460 may all have a complete replica or copy of the user's blockchain stored in memory, as well as executable instructions for the execution of hash functions, consensus algorithms, digital signature information, network protocols, and network commands. In this example, data authentication and event execution computing platform 410, first social media service computing platform 450, and second social media service computing platform 460 may authenticate social media data from social media service computing platforms 450, 460, user property records data from property records computing platform 470, user medical records data from medical records computing platform 480, and user data from other sources. For example, the blockchain for any given user may further include user transaction data from merchant databases and other financial records databases, estate management data from estate management databases, inheritance data from inheritance records, and other sources.

When functioning as a lightweight node 250, first social media service computing platform 450, second social media service computing platform 460, property records computing platform 470, medical records computing platform 480, user computing device 490, and data feed aggregation server 495 may request performance of network functions (e.g., to have user data authenticated onto the user's blockchain, to have smart contract operations executed after authentication of the underlying user data, and the like). However, when functioning as a lightweight node 250, first social media service computing platform 450, second social media service computing platform 460, property records computing platform 470, medical records computing platform 480, user computing device 490, and data feed aggregation server 495 may not have the capacity to execute the network functions and maintain inter-nodal agreement as to the state of any given user's blockchain.

As discussed in greater detail below, data authentication and event execution computing platform 410 may include one or more computing devices configured to perform one or more of the functions described herein. For example, data authentication and event execution computing platform 410 may include one or more computers (e.g., laptop computers, desktop computers, servers, server blades, or the like) that are configured to orchestrate data authentication operations and event execution operations across multiple computer systems and devices in computing environment 400.

Administrative computing device 420 may be a desktop computer, laptop computer, workstation, or other computing device that is configured to be used by an administrative user, such as a network administrator associated with an organization operating data authentication and event execution computing platform 410.

Social media service computing platform 450 may include one or more computing devices configured to host (e.g., on a website) a first social media service (which may, e.g., be provided by an organization different from the organization operating data authentication and event execution computing platform 410). In some instances, social media service computing platform 450 may maintain user information for various users of the first social media service, provide user interfaces associated with the first social media service to various user devices (e.g., user device 490), and provide activity feed data to other systems and/or devices included in computing environment 400, such as data authentication and event execution computing platform 410. For instance, social media service computing platform 450 may, in some arrangements, provide activity feed data (e.g., such as user-specific image data, user-specific geolocation data, user-specific likes data, and/or other user-specific data) to data authentication and event execution computing platform 410 to enable one or more functions provided by data authentication and event execution computing platform 410 (e.g., such as authentication of social media posts).

Social media service computing platform 460 may include one or more computing devices configured to host a second social media service (which may, e.g., be provided by an organization different from the organization operating data authentication and event execution computing platform 410). Additionally, the second social media service may be different from the first social media service (e.g., the second social media service may be provided by an organization different from the organization providing the first social media service). In some instances, social media service computing platform 460 may maintain user information for various users of the second social media service, provide user interfaces associated with the second social media service to various user devices (e.g., user computing device 490), and provide activity feed data to other systems and/or devices included in computing environment 400, such as data authentication and event execution computing platform 410. For instance, social media service computing platform 460 may, in some arrangements, provide activity feed data (e.g., such as user-specific image data, user-specific geolocation data, user-specific likes data, and/or other user-specific data) to data authentication and event execution computing platform 410 to enable one or more functions provided by data authentication and event execution computing platform 410 (e.g., such as authentication of social media posts).

Property records computing platform 470 may include one or more computing devices configured to receive, aggregate, and store records related to ownership and transfer of real property. For example, property records computing platform 470 may receive and store deeds to homes owned by users in a given geographical area or may maintain a recordation of title transfers. Property records computing platform 470 may also communicate and/or otherwise provide select property records to one or more destination systems, such as data authentication and event execution computing platform 410, so as to enable one or more functions provided by data authentication and event execution computing platform 410 (e.g., such as data authentication and event execution functions). In some instances, the data communicated by property records computing platform 470 to data authentication and event execution computing platform 410 may be communicated via a secure and/or encrypted communications link established between data authentication and event execution computing platform 410 and property records computing platform 470.

Medical records computing platform 480 may include one or more computing devices configured to receive, aggregate, and store records related to the health and medical history of one or more users. For example, medical records computing platform 480 may receive and store information related to when users received their last health screening, the results from the screening, any previous medical conditions associated with the users, medical procedures that these users underwent, and general comments from medical professionals about health-related issues associated with the users. Subsequently, medical records computing platform 480 may communicate and/or otherwise provide select medical records to one or more destination systems, such as data authentication and event execution computing platform 410, so as to enable one or more functions provided by data authentication and event execution computing platform 410 (e.g., such as data authentication and event execution functions). In some instances, the data communicated by medical records computing platform 480 to data authentication and event execution computing platform 410 may be communicated via a secure and/or encrypted communications link established between data authentication and event execution computing platform 410 and medical records computing platform 480.

User computing device 490 may be a desktop computer, laptop computer, workstation, mobile device, or other computing device that is configured to be used by a user to access services in environment 400, such as services provided by social media service computing platforms 450, 460.

Data feed aggregation server 495 may include one or more computing devices configured to aggregate data feeds from various source systems (e.g., social media service computing platform 450, social media service computing platform 460, property records computing platform 470, medical records computing platform 480, and/or other sources) and/or communicate data feeds to various destination systems (e.g., data authentication and event execution computing platform 410). In some instances, data feed aggregation server 495 may receive social media activity feed data from various social media platforms (e.g., social media service computing platform 450, social media service computing platform 460), property records data from property records computing platform 470, medical records data from medical records computing platform 480, financial transaction data (e.g., credit card purchase data, loan data) from various transactions databases (not shown), estate management data from estate management databases (not shown), and/or other activity data and/or content from other sources, and data feed aggregation server 495 may aggregate any and/or all of the received data to produce an aggregated data feed. Subsequently, data feed aggregation server 495 may communicate and/or otherwise provide the aggregated data feed to one or more destination systems, such as data authentication and event execution computing platform 410, so as to enable one or more functions provided by data authentication and event execution computing platform 410 (e.g., such as data authentication using blockchain technology and event execution via smart contracts). In some instances, the aggregated data feed may be communicated by data feed aggregation server 495 to data authentication and event execution computing platform 410 via a secure and/or encrypted communications link established between data authentication and event execution computing platform 410 and data feed aggregation server 495. In other instances, data feeds may be separately communicated from each of platforms 450, 460, 470, 480, and others to platform 410 via multiple secure and/or encrypted communications links established between platforms 450, 460, 470, and 480, among others, and platform 410.

Computing environment 400 also may include one or more networks, which may interconnect one or more of data authentication and event execution computing platform 410, administrative computing device 420, social media service computing platform 450, social media service computing platform 460, property records computing platform 470, medical records computing platform 480, user computing device 490, and data feed aggregation server 495. For example, computing environment 100 may include private network 430, which may be owned and/or operated by a specific organization and/or which may interconnect one or more systems and/or other devices associated with the specific organization. For example, data authentication and event execution computing platform 410 and administrative computing device 420 may be owned and/or operated by a specific organization, such as a financial institution, and private network 430 may interconnect data authentication and event execution computing platform 410, administrative computing device 420, and one or more other systems and/or devices associated with the organization. Additionally, private network 430 may connect (e.g., via one or more firewalls) to one or more external networks not associated with the organization, such as public network 440. Public network 440 may, for instance, include the internet and may connect various systems and/or devices not associated with the organization operating private network 430. For example, public network 440 may interconnect social media service computing platform 450, social media service computing platform 460, property records computing platform 470, medical records computing platform 480, user computing device 490, data feed aggregation server 495, and/or various other systems and/or devices.

In some arrangements, the computing devices that make up and/or are included in data authentication and event execution computing platform 410, administrative computing device 420, social media service computing platform 450, social media service computing platform 460, property records computing platform 470, medical records computing platform 480, user computing device 490, and data feed aggregation server 495 may be any type of computing device capable of receiving a user interface, receiving input via the user interface, and communicating the received input to one or more other computing devices. For example, the computing devices that make up and/or are included in data authentication and event execution computing platform 410, administrative computing device 420, social media service computing platform 450, social media service computing platform 460, property records computing platform 470, medical records computing platform 480, user computing device 490, and data feed aggregation server 495 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of the computing devices that make up and/or are included in data authentication and event execution computing platform 410, administrative computing device 420, social media service computing platform 450, social media service computing platform 460, property records computing platform 470, medical records computing platform 480, user computing device 490, and data feed aggregation server 495 may, in some instances, be special-purpose computing devices configured to perform specific functions.

Figure 5A:
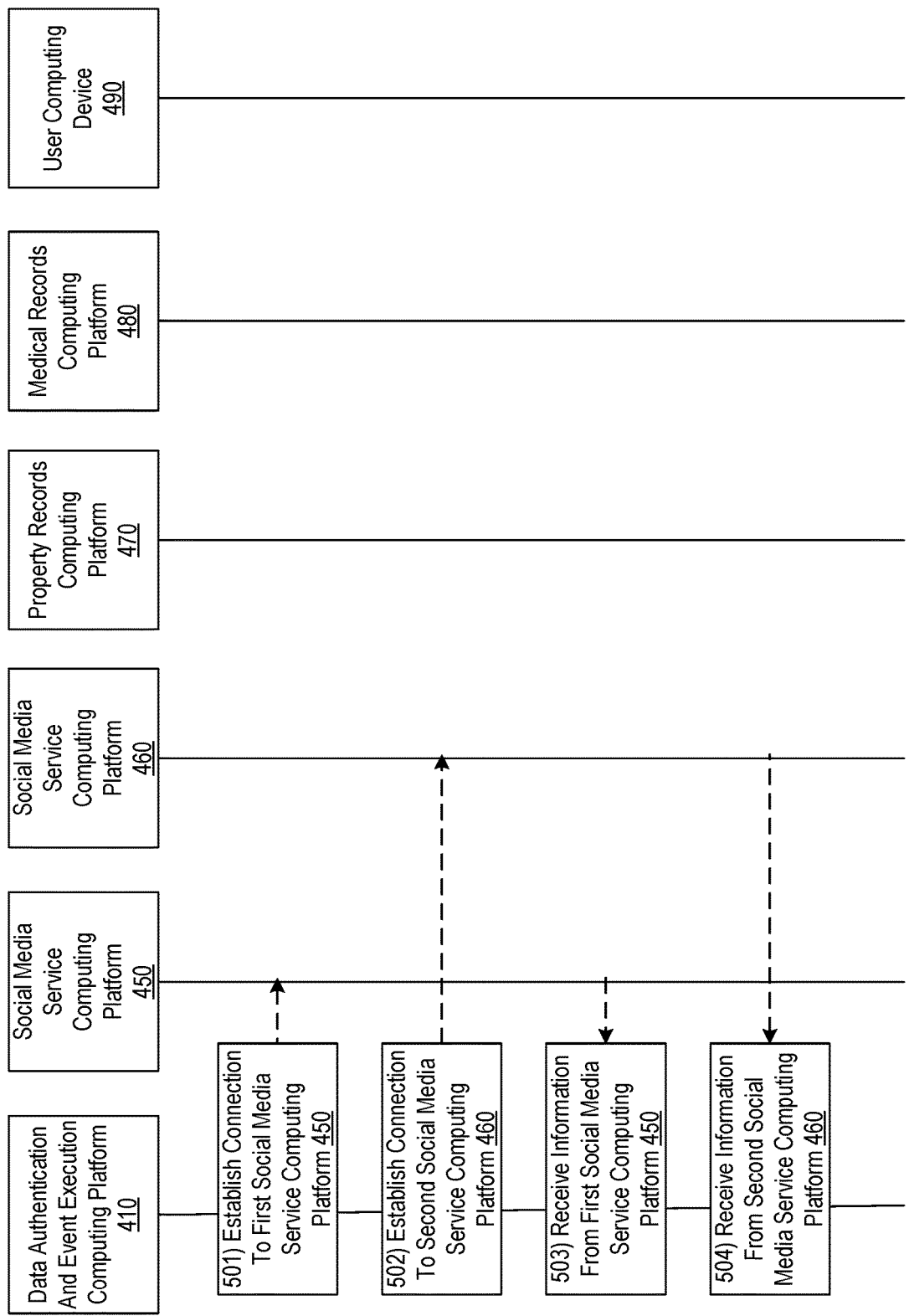
FIGS. 5A-5F depict an illustrative event sequence for authentication of user data and execution of events based on the authentication in accordance with one or more example embodiments.

FIGS. 5A-5F depict an illustrative event sequence for authentication of user data and execution of events based on the authentication in accordance with one or more example embodiments. Referring to FIG. 5A, at step 501, data authentication and event execution computing platform 410 may establish, via a network or communication interface (e.g., network interface 212), a first connection to a first social media service computing platform 450 and in step 502, data authentication and event execution computing platform 410 may establish, via a network or communication interface (e.g., network interface 212), a second connection to a second social media service computing platform 460. In general, data authentication and event execution computing platform 410 may establish connections to any number of social media service computing platforms. In one example, data authentication and event execution computing platform 410 may be operated by a financial institution such as a bank.

Social media service computing platforms 450, 460 may provide one or more social media feeds with information related to one or more users. A user may register with social media service computing platforms 450, 460 and social media service computing platforms 450, 460 may generate a user account and associated user credentials for logging into the user account. When the user enters valid user credentials, social media service computing platforms 450, 460 may provide the user with access to one or more services hosted by social media service computing platforms 450, 460. For example, the services hosted by social media service computing platforms 450, 460 may enable the user to receive and transmit messages to other users, upload pictures, share content of interest, and provide location information to generate a personalized social media feed associated with the user. The services hosted by social media service computing platforms 450, 460 also may enable the user to control who has access to the information in his or her personalized social media feed. For example, the user may limit access to user devices associated with friends, close acquaintances, or family members. In some examples, the user may also allow access to user devices associated with users that do not have an account on social media service computing platforms 450, 460.

Data authentication and event execution computing platform 410 (and/or associated devices such as administrative computing device 420) may also have access to a given user's social media feed on social media service computing platforms 450, 460 through private network 430 and public network 440. This access may be provided by the user associated with a given user account or someone who supervises the user associated with the user account (e.g., parent, guardian, or the like). Thus, once data authentication and event execution computing platform 410 has established connections to social media service computing platforms 450, 460, data authentication and event execution computing platform 410 may receive social media information from the first social media service computing platform 450 in step 503 and from the second social media service computing platform 460 in step 504.

In one example, data authentication and event execution computing platform 410 may help one or more users secure a personal brand through the use of blockchain technology. For example, after platform 410 gains access to a user's social media feeds on social media service computing platforms 450, 460, platform 410 may receive data posted to the user's social media feeds and then verify the authenticity of the data. For example, platform 410 may verify that the data was actually posted by the user who owns the social media accounts under review and/or with authorization by the user who owns the social media accounts under review. Platform 410 may accomplish this verification in several ways. In one example, platform 410 may identify a number of levels of authentication that the user associated with any given social media post satisfied in validating his identity prior to posting the social media post. In this regard, a level of authentication may correspond to various ways that the user can be authenticated. For example, one level of authentication may represent the fact that the user provided the correct login identifier and password in gaining access to the user's social media account. Another level of authentication may represent a token sent to by a device owned by the user (e.g., a token sent by the user's phone) to social media service computing platforms 450, 460 in gaining access to the user's social media account. Yet another level of authentication may represent a biometric scan of the user submitted as a prerequisite in gaining access to the user's account. For example, the user could submit a fingerprint or face scan prior to gaining access to his social media account. Further still, another level of verification may represent a location from which the user made the social media post (as determined by, for example, an Internet Protocol (IP) address or a global positioning system (GPS) location of the user making the social media post). If a user normally posts to his social media account from one location but has suddenly posted from a different location, platform 110 may flag this observation in questioning whether the user actually posted to his account or whether the account was inappropriately accessed by another party. In general, data authentication and event execution computing platform 410 may investigate whether the user provided the correct credentials for one of more of these levels of authentication in gaining access to the user's social media account. If, for example, the user only provided one level of authentication (e.g., a user id and password) in gaining access to his social media account, platform 410 may further investigate whether the user in question actually posted the corresponding social media post. However, if the user provided three levels of authentication (e.g., multi-factor authentication) in gaining access to his social media account, platform 410 may deem that the user's social media posts made during that session are authentic and have reliably been made by the user. Information about the various levels of authentication or verification for any given user may be recorded on the user's blockchain.

In addition, data authentication and event execution computing platform 410 may monitor a given user's social media feeds to determine if the feeds or other user information contains information that is potentially incorrect or dubious. For example, if the user generally does not post to his social media feed about a given topic and suddenly posts on that topic, platform 410 may further investigate the authenticity of the post to determine if the user actually posted this information or if an unauthorized person has posted this information under the guise of the user. In contrast, if the user posts on a topic similar to other topics that the user has posted on in the past, platform 410 may use that information as supporting the authenticity of the post. As another example, platform 410 may investigate whether a first user has created a social media account with a handle that is deceptively similar to the handle used by a second user, especially if the first user posts inflammatory material (e.g., hate cites) to his account pretending to be the second user. Platform 410 may use such triggers to determine when a given user's social media postings or other user information should be reviewed. In other aspects, platform 410 may periodically review all of the user's social media posts and/or other information about the user (e.g., comments about the user in online articles, blogs, and the like) regardless of any specific trigger to determine if that information is authentic. Once authenticated, platform 110 may add an indicator of the authenticated data or the authenticated data itself to the user's blockchain (e.g., by cryptographically hashing the information) to assure interested parties that the social media post or other information is authentic. Social media service computing platforms 450, 460 may also place an indicator of data authenticity next to all social media posts that have been authenticated (e.g., via an icon on the platform's website, an icon next to each authenticated post, and the like). In some aspects, platform 410 may also allow for the management of aliases used to gain access to a social media account through an identity management system.

In one example, data authentication and event execution computing platform 410 may serve as a full node computing device 210 and social media service computing platforms 450, 460 may serve as lightweight node computing devices 250. In other aspects, social media service computing platforms 450, 460 and data authentication and event execution computing platform 410 may each serve as full node computing devices 210. In this example, social media service computing platforms 450, 460 and data authentication and event execution computing platform 410 may all operate to create and maintain a decentralized network, execute requested network functions related to authentication of information in the user's social media accounts, maintain inter-nodal agreement as to the state of the user's blockchain, and execute events related to the user's authenticated data.

In some examples, if platform 410 is not able to authenticate a user's social media post (e.g., by verifying that the post has been made by the user or has been authorized by the user), then platform 410 may prevent the post from being displayed or may remove the post once the determination is made.

Figure 5B:
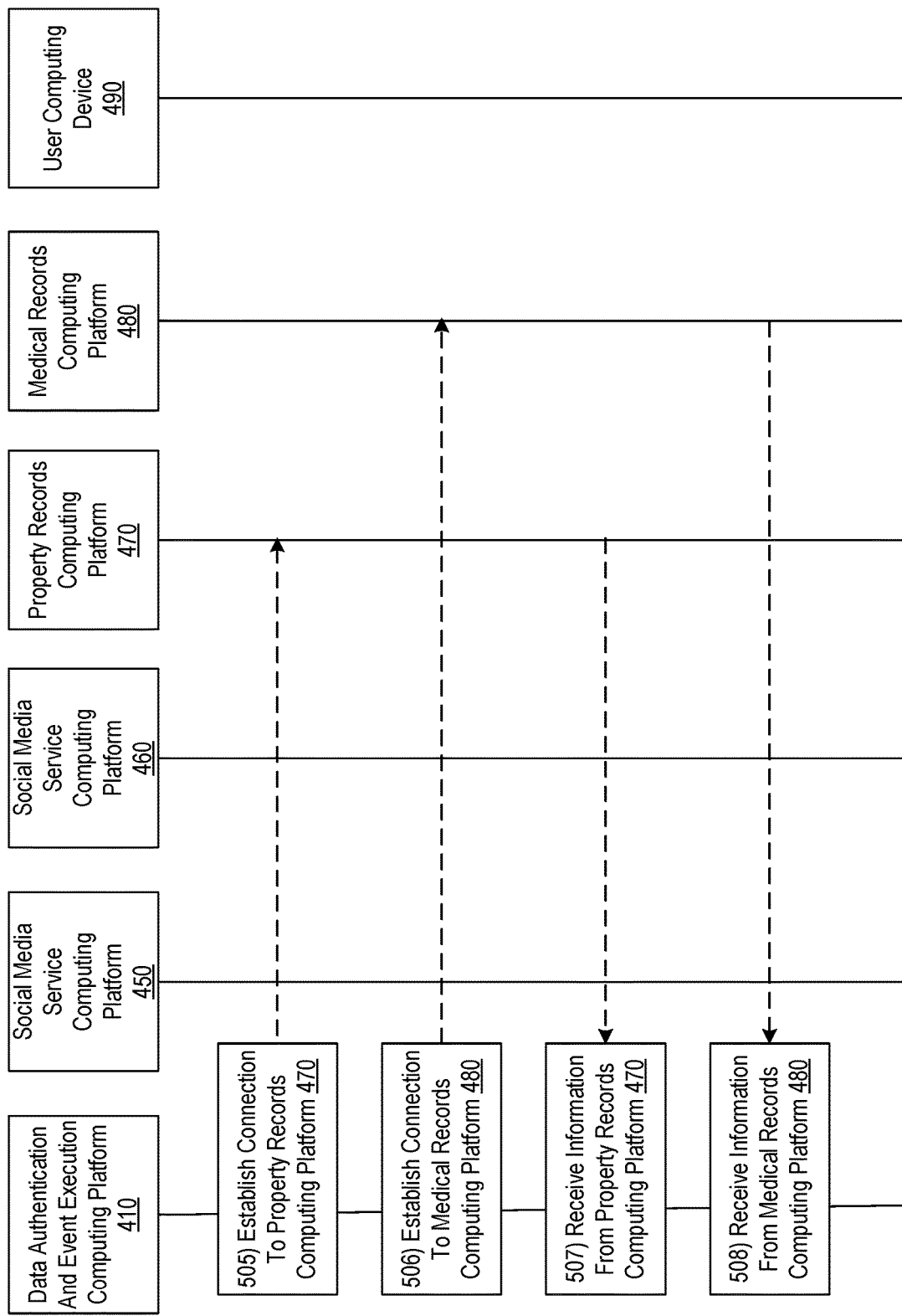

Referring to FIG. 5B, data authentication and event execution computing platform 410 may then establish connections to other sources of user information, including property records computing platform 470 in step 505 and medical records computing platform 480 in step 506. Once these connections have been established, data authentication and event execution computing platform 410 may receive information from property records computing platform 470 in step 507 and from medical records computing platform 480 in step 508. In some aspects, data feed aggregation server 495 may aggregate all of the information from social media service computing platforms 450, 460 and other sources (e.g., property records computing platform 470, medical records computing platform 480, user computing device 490, financial transactions computing platforms, estate management computing platforms) prior to transmission of that information to data authentication and event execution computing platform 410.

In some aspects, platform 410 may receive user data from only a subset of the data sources available to platform 410. For example, platform 410 may receive user data only from financial transaction databases that relate to financial transactions undertaken by the user. In this example, platform 410 may be tasked with authentication of the user's financial transactions and once authenticated may add this data to the user's blockchain. This data may then be used to build a rating of the user. For example, the data may be fed into a scoring model used by platform 410 to determine the authenticity and/or credit worthiness of the user. For example, if the authenticated data indicates that the user has consistently met his financial obligations on time (e.g., home loan payments, auto loan payments, credit card payments), then platform 410 may rate the individual more highly than if the data indicates that the user has missed his financial obligations. Either way, platform 410 may cryptographically encrypt the authenticated data (e.g., through a hashing process) and add the authenticated data to the user's blockchain so that the user's blockchain can serve as a verified source of immutable data for establishing or strengthening the user's personal brand.

Alternatively, platform 410 may receive user data only from estate management databases related to the user's will and distribution of the user's assets upon the user's death. In this example, data authentication and event execution computing platform 410 may be tasked with authentication of the user's will and related documents (e.g., property documents showing ownership of property by the user). Platform 410 may authenticate the user's will documents and then add the authenticated documents to the user's blockchain. Thereafter, platform 410 may then automatically execute the will upon the user's death (i.e., transfer the user's assets to the named beneficiaries under the terms of the will).

In one example, platform 410 may leverage blockchain to maintain a user's records such as past jobs, family information, personal records, financial information, social security, medical records, healthcare proxies, and power of attorney, among other things. In this aspect, platform 410 may aid in personal branding, estate management, document management (e.g., deeds to a house, wills, and the like), and with execution of smart contracts (e.g., addition of a user's death certificate to user's blockchain causes execution of user's will). In some aspects, the actions undertaken by platform 410 may be legally binding on the parties to the smart contract.

In another example, data authentication and event execution computing platform 410 may allow a user's inheritance of property to be recorded on the user's blockchain. Such a recordation would serve as tamper-proof indicia of the user's right to the property. In some aspects, the entire history of how title to the property passes from one owner to another may be recorded on the current owner's blockchain so that the current owner's blockchain can be used as immutable evidence of the true owner's identity. In some aspects, evidence of title to property as stored on the property owner's blockchain may serve as notarized proof of the owner's right to the property.

In yet another example, data authentication and event execution computing platform 410 may authenticate a user's financial transactions on the user's blockchain to establish or change a rating of the user. In one aspect, this rating may correspond to a credit rating to establish the credit worthiness or integrity of the user. In some aspects, platform 410 may use a scoring model along with the user's financial transaction data to determine the user's credit rating.

In some aspects, data authentication and event execution computing platform 410 may receive information from social media service computing platforms 450, 460, property records computing platform 470, medical records computing platform 480, and other sources in real time (e.g., as data is posted to social media service computing platforms 450, 460 and/or as data is stored in property records computing platform 470, medical records computing platform 480). In one example, in receiving information in real time, the information may be received by platform 410 within two minutes of being posted to social media service computing platforms 450, 460 and/or as data is stored in property records computing platform 470, medical records computing platform 480.

Figure 5C:
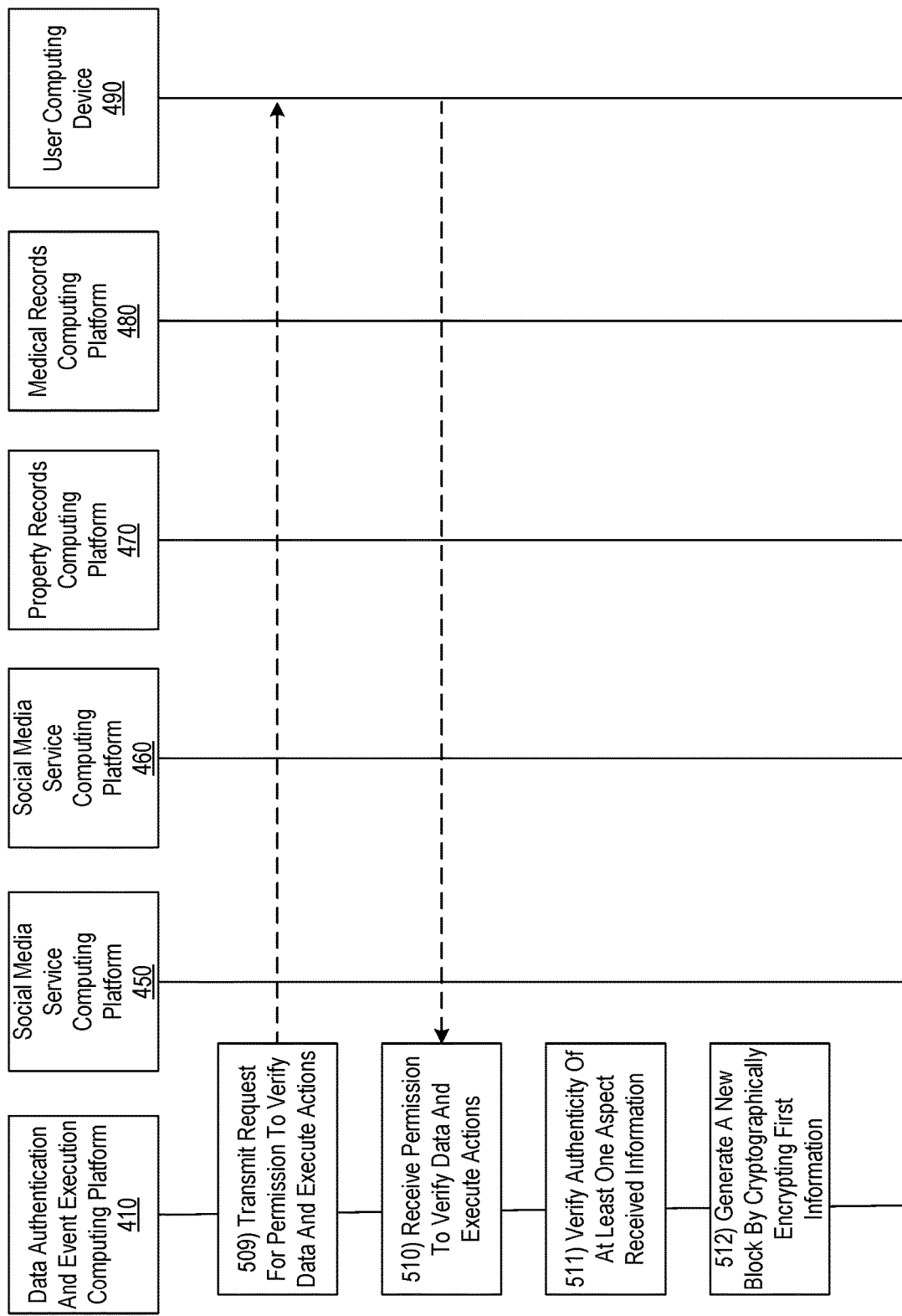
Figure 6:
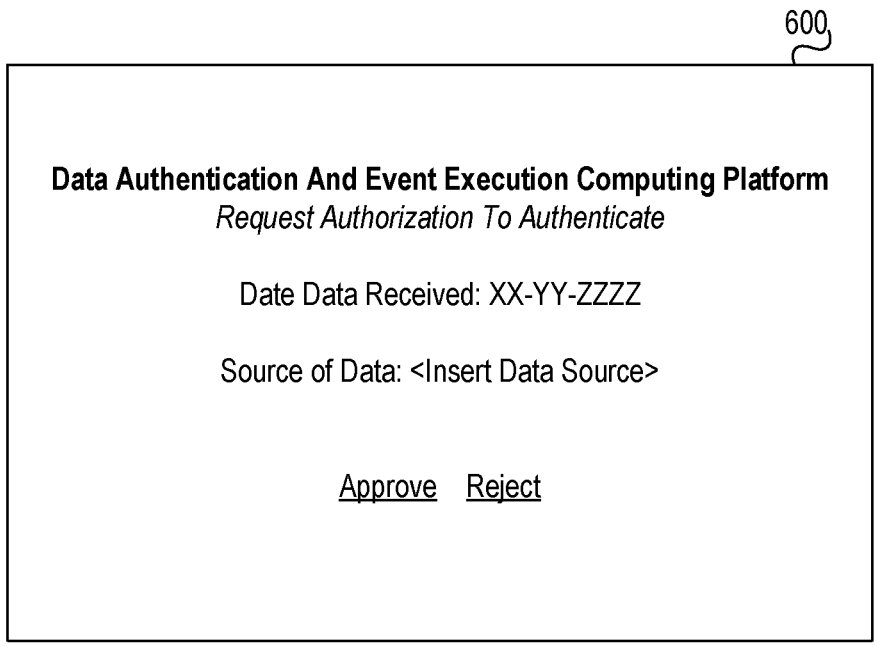
FIG. 6 depicts an example graphical user interface to obtain authorization for verifying the authenticity of user data in accordance with one or more example embodiments.

Referring to FIG. 5C, in step 509, data authentication and event execution computing platform 410 may then transmit, to user computing device 490, a request for permission to verify data authenticity and/or execute actions based on the user's data received in steps 503, 504, 507, and 508. Platform 410 may then receive, from user computing device 490, authorization to verify the authenticity of and/or execute actions based on the user's data in step 510. To obtain authorization for verifying the authenticity of user data, data authentication and event execution computing platform 410 may cause user computing device 490 to display and/or otherwise present a graphical user interface similar to graphical user interface 600, which is illustrated in FIG. 6. As shown in FIG. 6, graphical user interface 600 may include information related to the date the data to be authenticated was received by platform 410 and the source of the data. In the example shown in FIG. 6, user computing device 490 may approve or reject the request to verify the authenticity of the user data. In some aspects, if user computing device 490 does not provide permission to verify data authenticity and/or execute actions, platform 410 may not proceed with data authentication and execution of actions based on the received data. In other aspects, platform 410 may have already received pre-authorization to verify the authenticity of and/or execute actions based on the user's data received in steps 503, 504, 507, and 508.

Then, in step 511, data authentication and event execution platform 410 may verify the authenticity of at least one aspect of the information received in steps 503, 504, 507, or 508. For example, platform 410 may verify that a social media post (e.g., from social media service computing platforms 450, 460) was actually posted by the user who owns the user account to which the post was posted. In one example, platform 410 may perform this verification by identifying a number of levels of authentication the user associated with the social media post satisfied in validating his identity in gaining access to his social media account. In addition, platform 410 may verify the authenticity of a user's property documents (e.g., deeds, title recordations, and the like received from property records computing platform 470) and/or the authenticity of a user's medical records (e.g., doctor's reports, immunization records, health history, and the like received from medical records computing platform 480). Furthermore, platform 410 may verify the authenticity of a user's inheritance documents or financial transaction documents. In each of these instances, analyzing the authenticity of a particular record or document may include determining whether any signatures on the record or document are forged, determining whether the substantive contents of the record or document have been altered in any way, determining whether the right person possesses the document or record, and/or determining whether the document or record has been transmitted to the right person.

Platform 410 may make these determinations by mining the data at issue or related data stored on the user's blockchain. For example, platform 410 may identify an IP address of the location from which the social media post was made as a clue to verifying the identity of the user who made the post. In addition, if platform 410 is verifying the authenticity of a user's deed to property, platform 410 may analyze how title to the property has passed from one party to another prior to the user in question. Further still, if platform 410 is verifying the authenticity of the user's medical records, platform 410 may, with the user's permission, contact the relevant physician or other medical professional who created the medical record. In addition, platform 410 may determine whether the medical record is consistent with the user's additional medical records. For example, platform 410 may determine if the medical record lists the correct date of birth for the user or indicates pre-existing illnesses that are indicated on other medical records for the user. If platform 410 is verifying the authenticity of a financial transaction for the user, platform 410 may determine if the amount of the transaction raises any red flags when compared to the item or items subject to the transaction, may determine if the seller's location or other details associated with the seller seem suspicious, or may determine if there are multiple transactions for the same or similar item when there should normally only be one. In some aspects, platform 410 may also contact the user whose data is being verified via user computing device 490 to help with the verification process. For example, platform 410 may query user computing device 490 as to a suspiciously worded social media post, a suspicious financial transaction, or a suspicious document purporting to show property ownership. User computing device 490 may then either confirm or deny the authenticity of the information in question. In one example, platform 410 may accept the user's assessment of the authenticity of the information in question without further review. In other aspects, platform 410 may contact additional parties (e.g., a custodian of a mortgage deed document, a medical facility housing medical records, and the like) to further verify the authenticity of the document in question.

If the received data has been verified, then platform 410 may generate a new block of a blockchain associated with a user at least by cryptographically encrypting the first information in step 512. In some aspects, platform 410 may authenticate one or more parts of the received data and fail to authenticate other parts of the received data. In one example, platform 410 may not cryptographically encrypt the data to the user's blockchain if that data fails to be authenticated. In other examples, platform 410 may also encrypt unauthenticated data on the user's blockchain (e.g., appropriately including some indicia that the data was found to be unauthentic). In addition, platform 410 may transmit a notification of the outcome of the authentication process to user computing device 490 and then receive a response from user computing device 490 as to whether the data should be added to the user's blockchain.

Figure 5D:
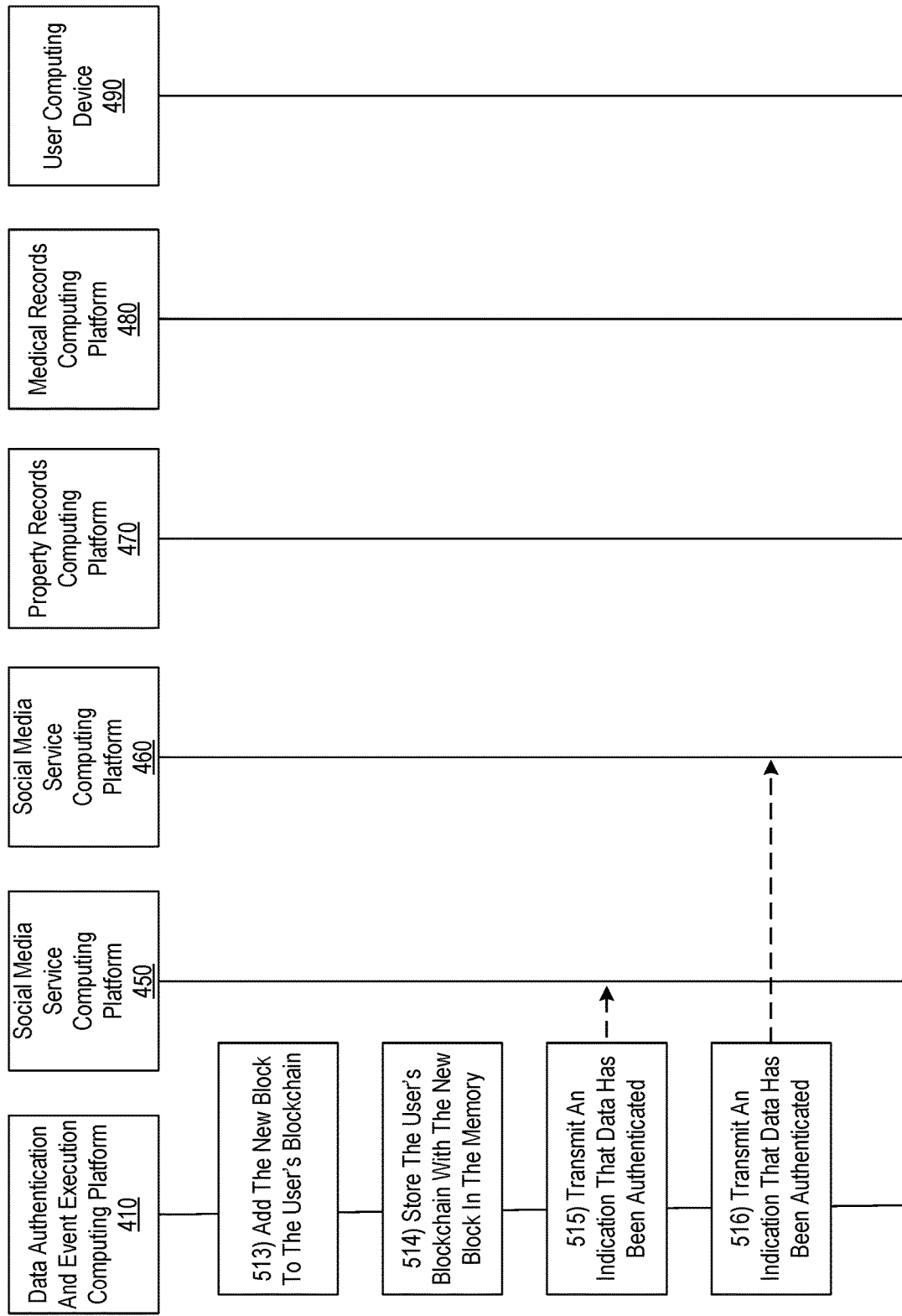

Referring to FIG. 5D, once the received data has been authenticated, data analysis and event execution platform 410 may add the new block to the user's blockchain in step 513. The block may be added in accordance with the principles of blockchain discussed herein. For example, data analysis and event execution platform 410 (and other full node computing devices 210A-210F operating in computing environment 400) may hash the digest of the authenticated data with the block hash of the most immediately preceding block of the user's blockchain (e.g., blockchain 226). Then processors of all full node computing devices 210A-210F within computing environment 400 may execute a consensus algorithm to identify a nonce corresponding to the particular executed consensus algorithm and related to the digest that combines the digest of the new block generated in step 512 and the block hash of the most immediately preceding block of the user's blockchain 226. The full node computing device 210A-210F selected from the consensus algorithm may add the new block to the user's blockchain. For example, in one example, any of data authentication and event execution computing platform 410, administrative computing device 420, first social media service computing platform 450, second social media service computing platform 460, property records computing platform 470, medical records computing platform 480, user computing device 490, and data feed aggregation server 495 may serve as full node computing devices 210A-210F in computing environment 400. In this example, each of data authentication and event execution computing platform 410, administrative computing device 420, first social media service computing platform 450, second social media service computing platform 460, property records computing platform 470, medical records computing platform 480, user computing device 490, and data feed aggregation server 495 may be candidates for adding a new block to a user's blockchain (based on the consensus algorithm chosen). In other examples, only a subset of data authentication and event execution computing platform 410, administrative computing device 420, first social media service computing platform 450, second social media service computing platform 460, property records computing platform 470, medical records computing platform 480, user computing device 490, and data feed aggregation server 495 may serve as full node computing devices 210A-210F in computing environment 400. In yet other examples, only data authentication and event execution computing platform 410 may serve as a full node computing device 210A-210F in computing environment 400. In this example, only data authentication and event execution computing platform 410 may add a new block to a user's blockchain.

Figure 5E:
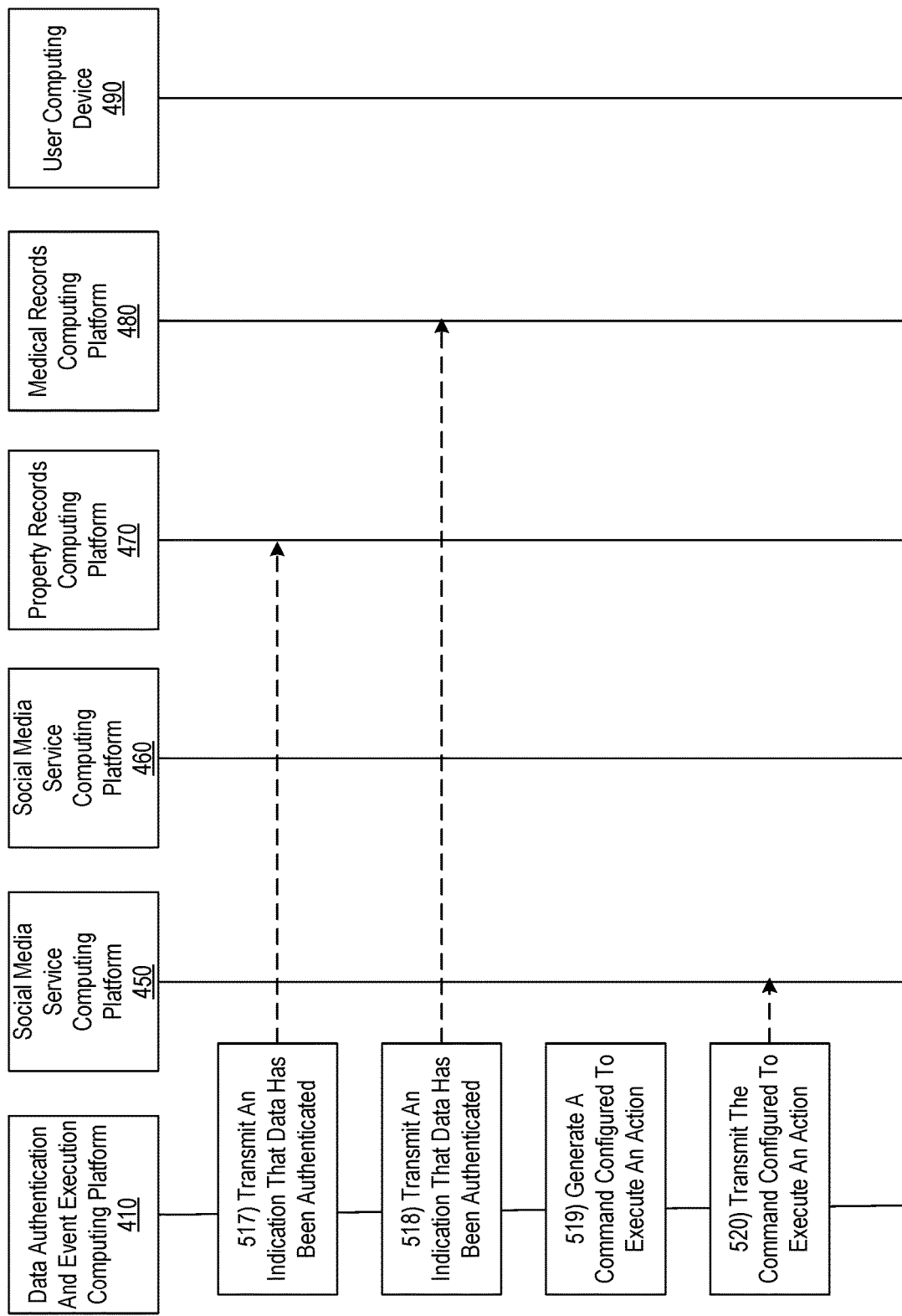
Figure 5F:
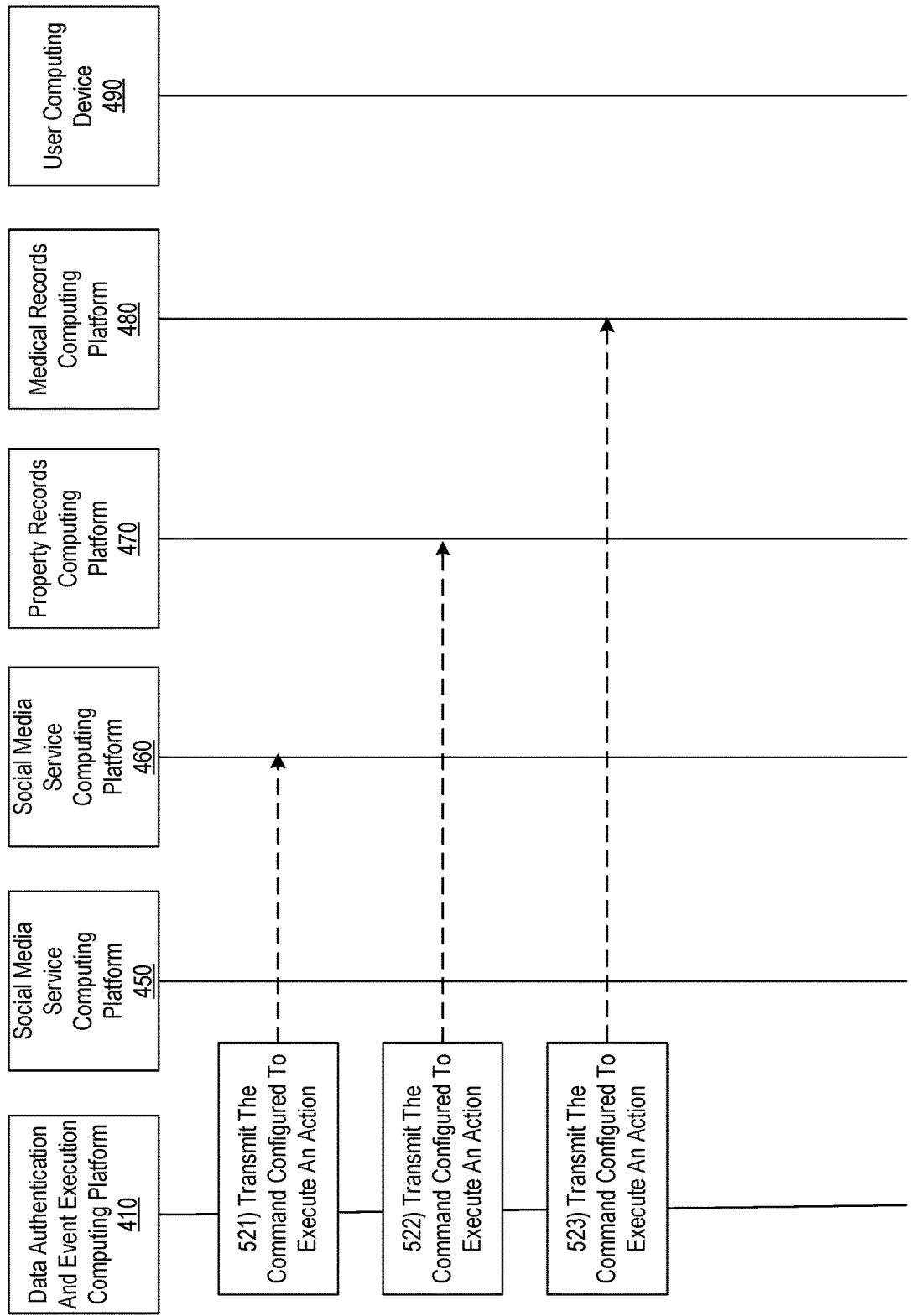
Figure 7:
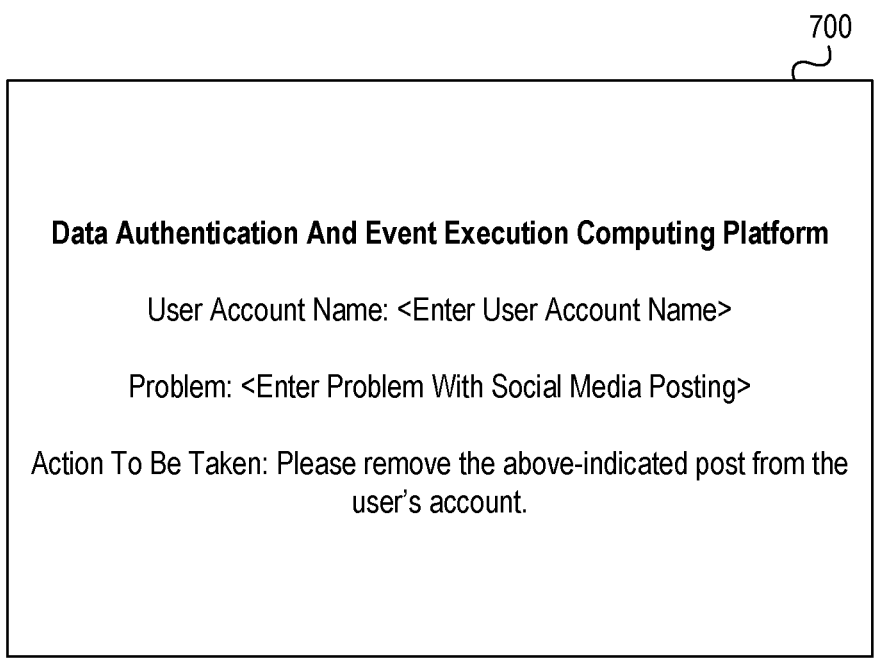
FIG. 7 depicts an example message transmitted from a data authentication and event execution computing platform indicating that a social media posting should be removed in accordance with one or more example embodiments.

Once the new block has been added to the user's blockchain, data authentication and event execution computing platform 410 (and any other devices operating as full node computing devices 210A-210F in computing environment 400) may, in step 514, store the user's blockchain with the new block in a memory. Referring to FIGS. 5D and 5E, assuming that platform 410 is the only full node computing device 210A-210F in computing environment 400, platform 410 may then transmit an indication that the received data has been authenticated to the computing platforms from which data was authenticated in steps 515, 516, 517, and 518. In some examples, platform 410 may further transmit an indication that the received data has been authenticated to other computing platforms, including a financial transaction computing platform, estate management computing platform, and the like. In additional examples, platform 410 may transmit an indication of data unauthenticity to a computing platform when data from that computing platform is determined to be unauthentic. In some aspects, the indication that the data has been determined to be authentic or unauthentic may be used by the recipient to take further action (e.g., contacting the user to which the data pertains, taking down a social media post determined to be unauthentic, and the like). In order to have a social media post removed, platform 410 may transmit a message to one or more of social media service computing platforms 450, 460. The message may indicate the user account to which the post belongs and describe the problem associated with the social media post at issue, as shown in FIG. 7. Message 700 may further instruct social media service computing platforms 450, 460 to remove the post from the user's account.

Then, in step 519, data authentication and event execution computing platform 410 (and any other devices operating as full node computing devices 210A-210F in computing environment 400) may generate a command configured to execute an action related to the authenticated data. For example, if a user's will has been authenticated, then platform 410 may transmit a command to an estate management computing platform to execute the terms of the will once the user has died (e.g., distributing the user's estate). As another example, if a user's property documents have been validated, then platform 410 may take the necessary steps to have the title to the property recorded at the appropriate office. In yet another example, if a user's medical records have been validated, then platform 410 may transmit those records to an office seeking those records on behalf of the user. Further still, if a user's social media post has been authenticated, platform 410 may post the social media post to a website hosted by social media service computing platforms 450, 460 (e.g., in embodiments where social media service computing platforms 450, 460 use platform 410 to authenticate all social media posts prior to posting them to their websites). In some examples, prior to taking an action based on the authenticated data, platform 410 may transmit a request for permission to execute actions based on the underlying data to user computing device 490. Platform 410 may then wait for a response granting permission to execute actions from user computing device 490. In other examples, platform 410 may have received pre-authorization from user computing device 490 to execute one or more actions based on the authenticated data. Finally, referring to FIGS. 5E and 5F, in steps 520-523, platform 410 may transmit the command configured to execute an action to the appropriate computing platform to which the data pertains.

Figure 8:
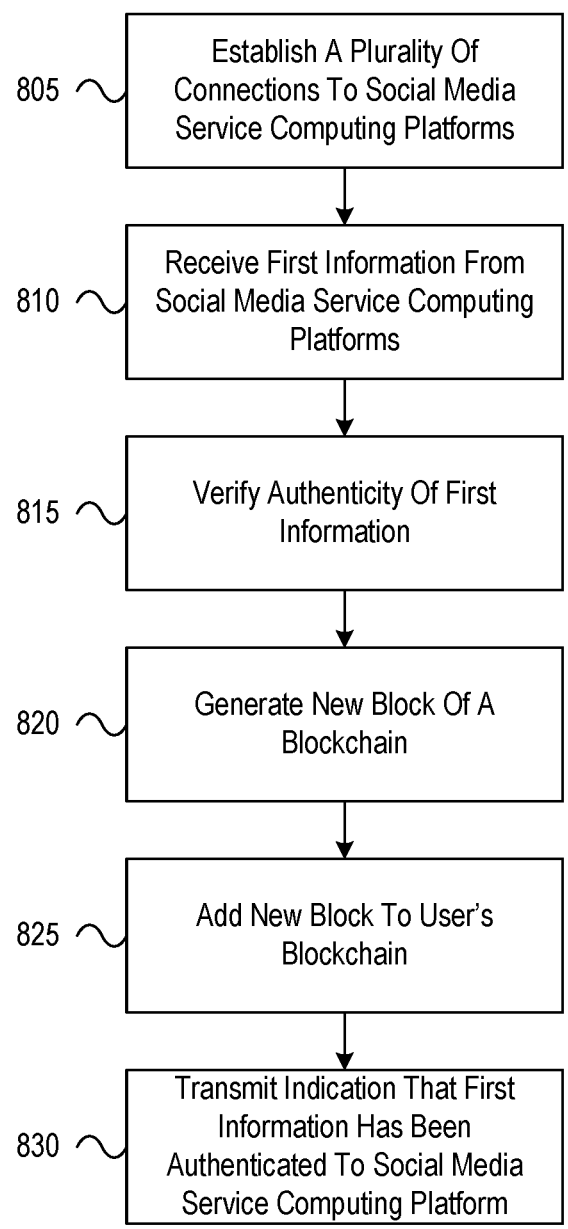
FIG. 8 depicts an illustrative first method for authentication of user data and execution of events based on the authentication in accordance with one or more example embodiments.

FIG. 8 depicts an illustrative first method for authentication of user data and execution of events based on the authentication in accordance with one or more example embodiments. Referring to FIG. 8, at step 805, a computing platform having at least one processor, a memory, and a communication interface may establish, via the communication interface, a plurality of connections to a plurality of social media service computing platforms. Subsequently, at step 810, the computing platform may receive first information from at least one of the plurality of social media service computing platforms. Then, at step 815, the computing platform may verify the authenticity of at least one aspect of the first information. At step 820, the computing platform may generate a new block of a blockchain associated with a user at least by cryptographically encrypting the first information. Next, in step 825, the computing platform may add the new block to the blockchain. Finally, in step 830, the computing platform may transmit, via the communication interface, an indication to the at least one of the plurality of social media service computing platforms that the first information has been authenticated.

Figure 9:
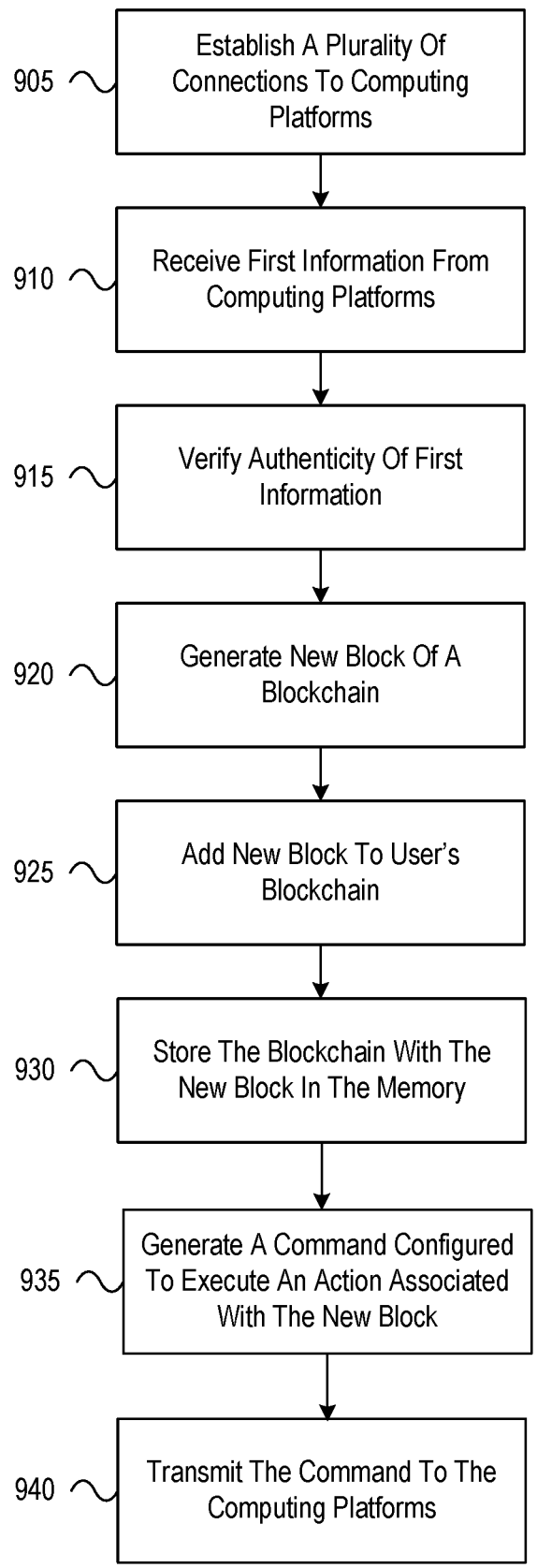
FIG. 9 depicts an illustrative second method for authentication of user data and execution of events based on the authentication in accordance with one or more example embodiments.

FIG. 9 depicts an illustrative second method for authentication of user data and execution of events based on the authentication in accordance with one or more example embodiments. Referring to FIG. 9, at step 905, a system having at least one processor, a memory, and a communication interface may establish, via the communication interface, a plurality of connections to a plurality of computing platforms. Subsequently, at step 910, the system may receive first information from at least one of the plurality of computing platforms. Then, at step 915, the system may verify the authenticity of at least one aspect of the first information. At step 920, the system may generate a new block of a blockchain associated with a user at least by cryptographically encrypting the first information. Next, in step 925, the system may add the new block to the blockchain. Then, at step 930, the system may store the blockchain with the new block in the memory. Then, in step 935, the system may generate a command configured to execute an action associated with the new block. Finally, in step 940, the system may transmit, via the communication interface, the command to the at least one of the plurality of computing platforms.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system, comprising:
   at least one processor;
   a communication interface communicatively coupled to the at least one processor; and
   memory storing computer-readable instructions that, when executed by the at least one processor, cause the system to:
      establish, via the communication interface, a plurality of connections to a plurality of computing platforms, wherein each of the plurality of computing platforms comprises an enterprise computing system providing an electronic service to a user;
      while the plurality of connections is established, receive first information from at least one of the plurality of computing platforms, wherein the first information comprises a data record associated an activity of a user;
      verify authenticity of at least one aspect of the first information;
      after verifying the authenticity, generate a new block of a blockchain associated with a user at least by cryptographically encrypting the first information;
      add the new block to the blockchain;
      store the blockchain with the new block in the memory;
      send, to a user device of the user, a request for permission to execute a command based on authenticated first information;
      generate, based on an authentication response comprising user input received from the user device, a command configured to cause a target computing platform of the plurality of computing platforms to execute an action associated with authenticated information of the new block, wherein the target computing platform corresponds to the authenticated information that comprises a will;
      transmit, via the communication interface, the command to the target computing platform of the plurality of computing platforms, wherein the target computing platform comprises an estate management computing platform; and
      trigger, based on transmission of the command and by the target computing platform, automatic transfer of assets corresponding to the authenticated information.

2. The system of claim 1, wherein the at least one of the plurality of computing platforms comprises at least one of a medical records computing platform and a property records computing platform.

3. The system of claim 1, wherein the first information comprises data related to past jobs held by the user, data related to a family of the user, and medical records of the user.

4. The system of claim 1, wherein the action is associated with a smart contract.

5. The system of claim 4, wherein the action comprises execution of a will associated with the user and the target computing platform comprises an estate management computing platform.

6. The system of claim 1, wherein the action relates to authentication of the user associated with the first information.

7. The system of claim 1, wherein the command relates to changing a rating of the user associated with the first information based on verifying the authenticity of the at least one aspect of the first information.

8. The system of claim 1, wherein generating the new block comprises hashing the first information.

9. The system of claim 1, wherein the first information comprises data related to property inherited by the user.

10. The system of claim 1, wherein the first information relates to estate management of the user and the command relates to distributing an estate of the user once the user has died.

11. The system of claim 1, wherein the action is intended to be legally binding.

12. The system of claim 1, wherein the command relates to improving a rating of the user.

13. A method, comprising:
at a system comprising at least one processor, memory, and a communication interface:
establishing, via the communication interface, a plurality of connections to a plurality of computing platforms;
while the plurality of connections is established, receiving first information from a first computing system of the plurality of computing platforms;
sending, to a user device, a request to execute an action after authentication of the first information;
verifying authenticity of at least one aspect of the first information;
after verifying the authenticity, generating a new block of a blockchain associated with a user at least by cryptographically encrypting the first information;
adding the new block to the blockchain;
storing the blockchain with the new block in the memory;
generating, based on an authentication response comprising user input received from the user device, a command configured to cause an estate management computing platform associated with a will of the authenticated information to execute an action associated with authentication information of the new block;
transmitting, based on an authorization response received from the user device, via the communication interface, the command to the first computing system of the plurality of computing platforms; and
triggering, based on transmission of the command and by the estate management computing platform, automatic transfer of assets corresponding to the authenticated information.

14. The method of claim 13, wherein the action is associated with a smart contract.

15. The method of claim 13, wherein the command relates to changing a rating of the user associated with the first information based on verifying the authenticity of the at least one aspect of the first information.

16. The method of claim 13, wherein generating the new block further comprises hashing the first information.

17. The method of claim 13, wherein the first information relates to estate management of the user and the command relates to distributing an estate of the user once the user has died.

18. The method of claim 13, wherein the first information comprises data related to past jobs held by the user, data related to a family of the user, and medical records of the user.

19. The method of claim 13, wherein the at least one of the plurality of computing platforms comprises at least one of a medical records computing platform and a property records computing platform.

20. One or more non-transitory computer-readable media storing instructions that, when executed by a system comprising at least one processor, memory, and a communication interface, cause the system to:
establish, via the communication interface, a plurality of connections where each connection is to a different one of a plurality of computing platforms, wherein each of the plurality of computing platforms comprises an enterprise computing system providing an electronic service to a user;
while the plurality of connections is established, receive first information from at least one of the plurality of computing platforms, wherein the first information comprises a data record associated an activity of a user;
verify authenticity of at least one aspect of the first information;
generate a new block of a blockchain associated with a user at least by cryptographically encrypting the first information;
add the new block to the blockchain;
store the blockchain with the new block in the memory;
send, to a user device of the user, a request for permission to execute a command based on authenticated first information that comprises a will;
generate, based on an authentication response comprising user input received from the user device, a command configured to cause a target computing platform of the plurality of computing platforms to execute an action associated with authenticated information of the new block, wherein the target computing platform comprises an estate management computing platform;
transmit, via the communication interface, the command to the at least one of the plurality of computing platforms; and
trigger, based on transmission of the command and by the target computing platform, automatic transfer of assets corresponding to the authenticated information.

* * * * *